(12) United States Patent
Jhang et al.

(10) Patent No.: US 12,481,125 B2
(45) Date of Patent: Nov. 25, 2025

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Fujian (CN); Zhao Wang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 783 days.

(21) Appl. No.: 17/835,975

(22) Filed: Jun. 9, 2022

(65) Prior Publication Data
US 2023/0204911 A1  Jun. 29, 2023

(30) Foreign Application Priority Data
Dec. 28, 2021  (CN) .......................... 202111626385.9

(51) Int. Cl.
*G02B 9/64* (2006.01)
*G02B 1/04* (2006.01)
*G02B 13/00* (2006.01)

(52) U.S. Cl.
CPC ............... *G02B 9/64* (2013.01); *G02B 1/041* (2013.01); *G02B 13/0045* (2013.01)

(58) Field of Classification Search
CPC ....... G02B 9/64; G02B 1/041; G02B 13/0045
See application file for complete search history.

(56) References Cited

U.S. PATENT DOCUMENTS

2019/0101729 A1  4/2019 Hsieh et al.
2022/0404582 A1* 12/2022 Huang ............... G02B 13/0045

FOREIGN PATENT DOCUMENTS

| CN | 107831588 | 3/2018 |
|---|---|---|
| CN | 108121056 | 6/2018 |
| CN | 111580252 | 8/2020 |
| CN | 111929815 | 11/2020 |
| CN | 112394487 | 2/2021 |
| CN | 112394488 | 2/2021 |
| CN | 112817123 | 5/2021 |

OTHER PUBLICATIONS

"Office Action of China Counterpart Application", issued on Feb. 21, 2024, p. 1-p. 26.

* cited by examiner

*Primary Examiner* — Nathanael R Briggs
(74) *Attorney, Agent, or Firm* — JCIPRNET

(57) ABSTRACT

An optical imaging lens is provided. The optical imaging lens includes a first lens element, a second lens element, a third lens element, a fourth lens element, a fifth lens element, a sixth lens element, a seventh lens element, and an eighth lens element sequentially arranged along an optical axis from an object side to an image side. The third lens element has positive refracting power, and a periphery region of an object-side surface of the third lens element is concave. An optical axis region of an image-side surface of the fifth lens element is concave, and a periphery region of the image-side surface of the fifth lens element is convex. An optical axis region of an object-side surface of the sixth lens element is concave. The seventh lens element has negative refracting power. Lens elements of the optical imaging lens are only the eight lens elements.

20 Claims, 26 Drawing Sheets

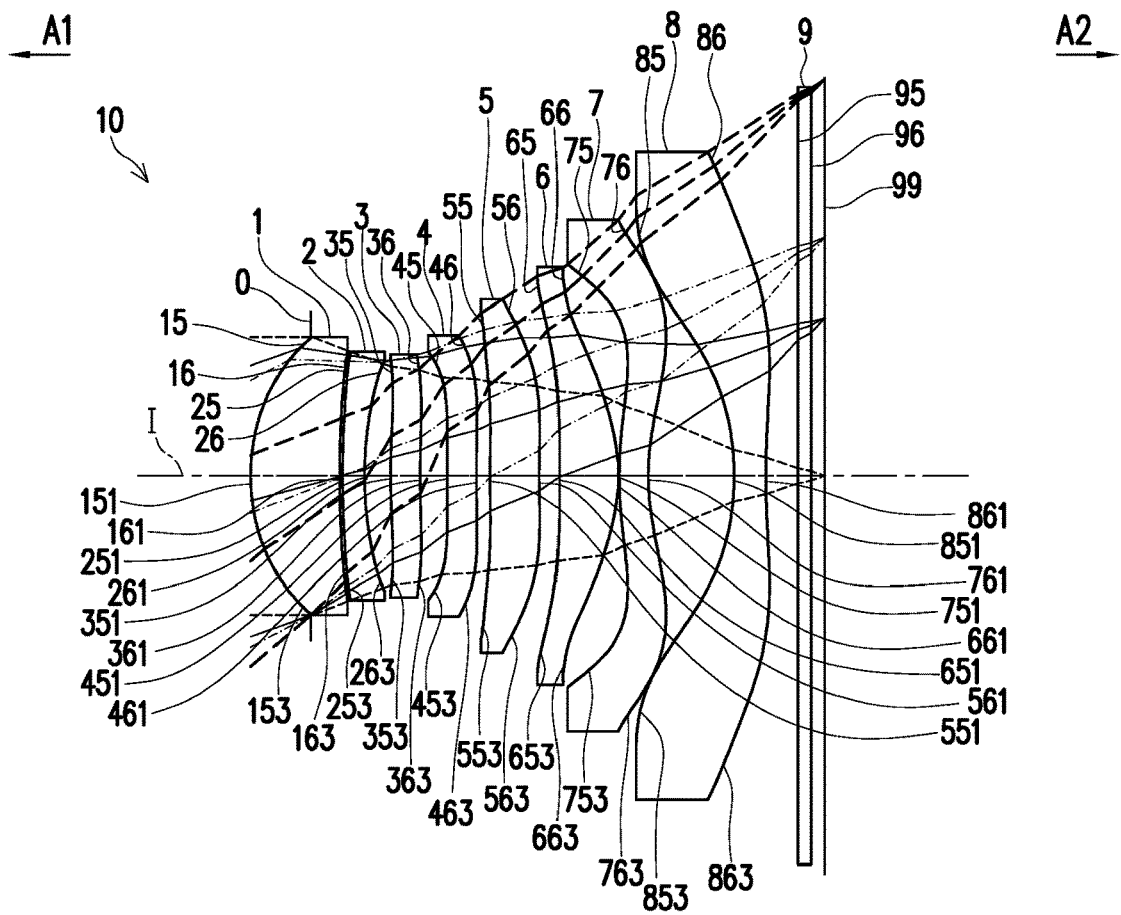
Figure 6
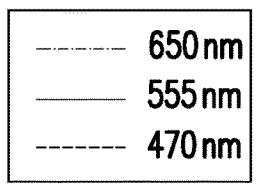
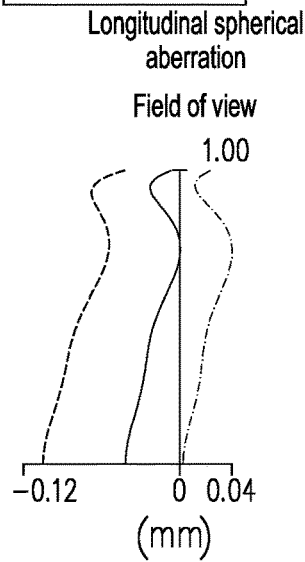
Longitudinal spherical aberration
Field of view
1.00
-0.12  0  0.04
(mm)
Figure 7A
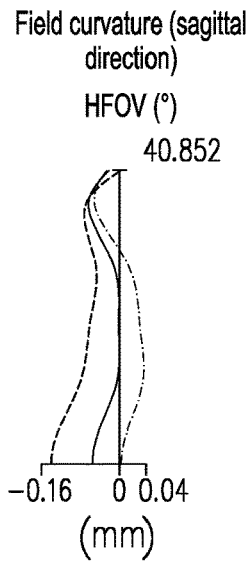
Field curvature (sagittal direction)
HFOV (°)
40.852
-0.16  0  0.04
(mm)
Figure 7B
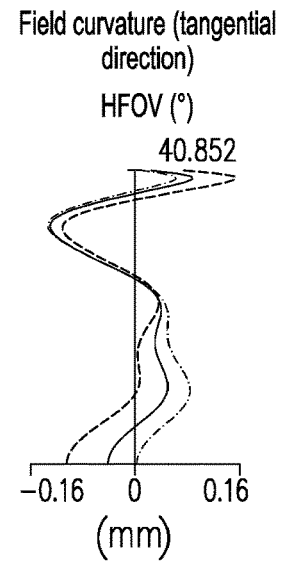
Field curvature (tangential direction)
HFOV (°)
40.852
-0.16  0  0.16
(mm)
Figure 7C
Distortion
HFOV (°)
40.852
0  12
(%)
Figure 7D

| First embodiment | | | | | | |
|---|---|---|---|---|---|---|
| EFL=6.525 mm, HFOV=40.852 degrees, System length=8.972 mm, Fno=1.500, Image height=6.200 mm | | | | | | |
| Device | Surface | Radius of curvature (mm) | Thickness (mm) | Refractive index | Abbe number | Focal length (mm) |
| Object | | Infinity | Infinity | | | |
| Aperture0 | | Infinity | -0.933 | | | |
| First lens element 1 | Object-side surface15 | 3.161 | 1.385 | 1.545 | 55.987 | 6.898 |
| | Image-side surface16 | 16.579 | 0.043 | | | |
| Second lens element 2 | Object-side surface25 | 12.016 | 0.345 | 1.671 | 19.243 | -14.999 |
| | Image-side surface26 | 5.442 | 0.412 | | | |
| Third lens element 3 | Object-side surface35 | 13.850 | 0.462 | 1.671 | 19.243 | 51.643 |
| | Image-side surface36 | 22.615 | 0.419 | | | |
| Fourth lens element 4 | Object-side surface45 | 39.673 | 0.457 | 1.671 | 19.243 | -48.115 |
| | Image-side surface46 | 17.812 | 0.216 | | | |
| Fifth lens element 5 | Object-side surface55 | 19.188 | 0.771 | 1.545 | 55.987 | -582.247 |
| | Image-side surface56 | 17.839 | 0.311 | | | |
| Sixth lens element 6 | Object-side surface65 | -47.081 | 0.917 | 1.671 | 19.243 | 4.333 |
| | Image-side surface66 | -2.785 | 0.015 | | | |
| Seventh lens element 7 | Object-side surface75 | 6.130 | 0.452 | 1.642 | 22.409 | -12.918 |
| | Image-side surface76 | 3.434 | 1.346 | | | |
| Eighth lens element 8 | Object-side surface85 | -4.331 | 0.496 | 1.535 | 55.690 | -5.866 |
| | Image-side surface86 | 12.024 | 0.500 | | | |
| Filter 9 | Object-side surface95 | Infinity | 0.210 | 1.517 | 64.167 | |
| | Image-side surface96 | Infinity | 0.213 | | | |
| | Image plane 99 | Infinity | | | | |

Figure 8

| Surface | K | $a_4$ | $a_6$ | $a_8$ | $a_{10}$ |
|---|---|---|---|---|---|
| 15 | 1.636105E-01 | 9.276605E-04 | 1.467906E-05 | -1.991373E-05 | 4.587878E-05 |
| 16 | 0.000000E+00 | -4.966017E-03 | 2.984963E-03 | -7.978179E-04 | 2.196680E-04 |
| 25 | 1.350041E+00 | -1.185947E-02 | 4.485310E-03 | -1.286213E-03 | 4.803953E-04 |
| 26 | -7.056594E-01 | -4.436007E-03 | -1.394691E-03 | 3.552192E-03 | -2.339296E-03 |
| 35 | 0.000000E+00 | -6.761438E-03 | -2.779257E-03 | 6.820054E-04 | -3.598925E-04 |
| 36 | 0.000000E+00 | -5.310215E-03 | -2.996258E-03 | 2.288623E-04 | 6.469281E-05 |
| 45 | 0.000000E+00 | -1.488490E-02 | 1.271452E-03 | -2.063593E-03 | -1.260543E-03 |
| 46 | 0.000000E+00 | -2.445406E-02 | 1.386416E-02 | -1.129303E-02 | 5.334761E-03 |
| 55 | 0.000000E+00 | -3.492100E-02 | 1.565939E-02 | -6.138479E-03 | 1.551420E-03 |
| 56 | 0.000000E+00 | -3.545968E-02 | 1.150759E-02 | -5.599347E-03 | 1.726967E-03 |
| 65 | 0.000000E+00 | -1.072240E-02 | 9.021510E-03 | -5.617485E-03 | 1.719075E-03 |
| 66 | -3.425900E+00 | 1.594153E-02 | -8.653096E-03 | 3.206806E-03 | -9.351311E-04 |
| 75 | -5.102430E+01 | 1.063139E-02 | -7.389014E-03 | 1.650813E-03 | -2.974619E-04 |
| 76 | -1.756073E+01 | 3.831788E-03 | -2.946038E-03 | 3.548572E-04 | -5.359081E-06 |
| 85 | -6.420522E-01 | -7.029234E-03 | 7.313123E-04 | -2.072895E-04 | 6.045287E-05 |
| 86 | 3.480073E-01 | -9.139091E-03 | 6.050316E-04 | -6.669846E-05 | 6.524812E-06 |
| Surface | $a_{12}$ | $a_{14}$ | $a_{16}$ | $a_{18}$ | $a_{20}$ |
| 15 | -1.445431E-05 | 2.504883E-06 | -1.401226E-07 | | |
| 16 | -5.127929E-05 | 7.126507E-06 | -4.504908E-07 | | |
| 25 | -1.391416E-04 | 2.274740E-05 | -1.514420E-06 | | |
| 26 | 8.881056E-04 | -1.806870E-04 | 1.659421E-05 | | |
| 35 | 1.711708E-04 | -3.526767E-05 | 3.117851E-06 | | |
| 36 | -8.759157E-06 | 6.443040E-06 | -1.106062E-06 | | |
| 45 | 1.730279E-03 | -8.609070E-04 | 2.383007E-04 | -3.588329E-05 | 2.289868E-06 |
| 46 | -1.758056E-03 | 4.206741E-04 | -6.738697E-05 | 6.193179E-06 | -2.393241E-07 |
| 55 | -1.263456E-04 | -3.230377E-05 | 9.153874E-06 | -8.674580E-07 | 2.959696E-08 |
| 56 | -2.680337E-04 | 1.641504E-05 | 3.911592E-07 | -8.227645E-08 | 2.045148E-09 |
| 65 | -2.824492E-04 | 2.537479E-05 | -1.134174E-06 | 1.584704E-08 | 2.355710E-10 |
| 66 | 1.861250E-04 | -2.249533E-05 | 1.565833E-06 | -5.746416E-08 | 8.534380E-10 |
| 75 | 4.336617E-05 | -4.682302E-06 | 3.177387E-07 | -1.116473E-08 | 1.440960E-10 |
| 76 | -4.071703E-06 | 5.561454E-07 | -3.400086E-08 | 1.037016E-09 | -1.275500E-11 |
| 85 | -7.487727E-06 | 4.871716E-07 | -1.779305E-08 | 3.475820E-10 | -2.841000E-12 |
| 86 | -3.233233E-07 | 5.513590E-09 | 1.223150E-10 | -5.956000E-12 | 6.200000E-14 |

Figure 9

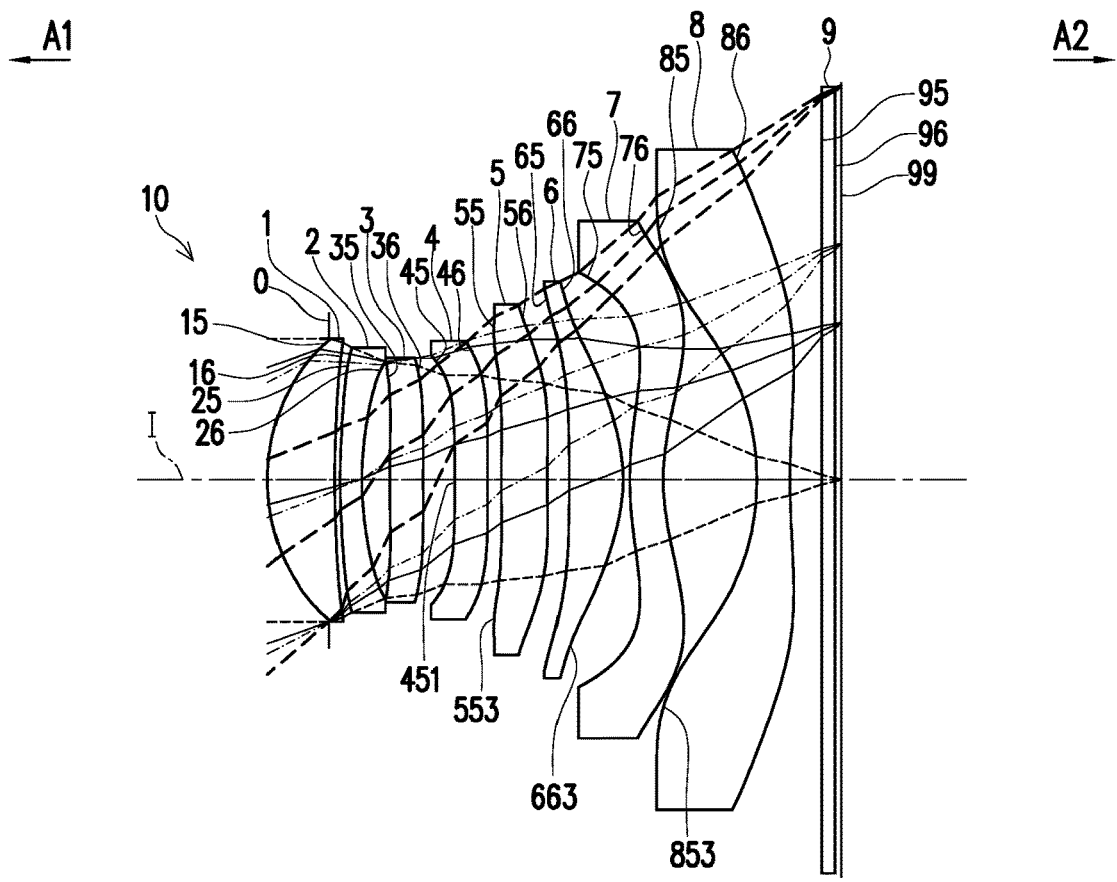
Figure 10
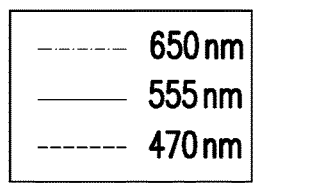
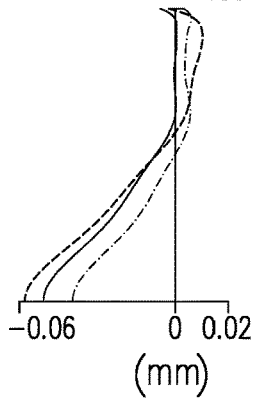
Figure 11A
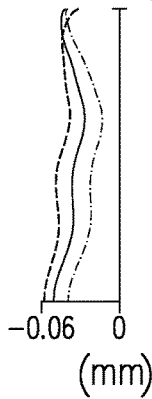
Figure 11B
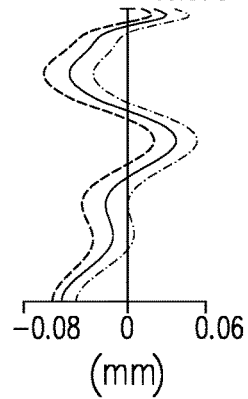
Figure 11C
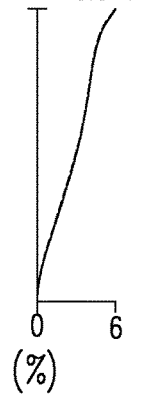
Figure 11D

| Second embodiment | | | | | | |
|---|---|---|---|---|---|---|
| EFL=6.673 mm, HFOV=40.870 degrees, System length=9.000 mm, Fno=1.500, Image height=6.200 mm | | | | | | |
| Device | Surface | Radius of curvature (mm) | Thickness (mm) | Refractive index | Abbe number | Focal length (mm) |
| Object | | Infinity | Infinity | | | |
| Aperture0 | | Infinity | -0.959 | | | |
| First lens element 1 | Object-side surface15 | 3.175 | 1.052 | 1.545 | 55.987 | 6.828 |
| | Image-side surface16 | 18.848 | 0.086 | | | |
| Second lens element 2 | Object-side surface25 | 11.248 | 0.342 | 1.671 | 19.243 | -15.296 |
| | Image-side surface26 | 5.328 | 0.438 | | | |
| Third lens element 3 | Object-side surface35 | 28.450 | 0.522 | 1.671 | 19.243 | 51.706 |
| | Image-side surface36 | 150.289 | 0.497 | | | |
| Fourth lens element 4 | Object-side surface45 | -132.202 | 0.515 | 1.671 | 19.243 | -53.707 |
| | Image-side surface46 | 50.289 | 0.217 | | | |
| Fifth lens element 5 | Object-side surface55 | 18.096 | 0.723 | 1.545 | 55.987 | -9.679E+12 |
| | Image-side surface56 | 17.841 | 0.338 | | | |
| Sixth lens element 6 | Object-side surface65 | -47.082 | 0.846 | 1.545 | 55.987 | 5.126 |
| | Image-side surface66 | -2.660 | 0.107 | | | |
| Seventh lens element 7 | Object-side surface75 | 5.845 | 0.526 | 1.642 | 22.409 | -14.536 |
| | Image-side surface76 | 3.478 | 1.472 | | | |
| Eighth lens element 8 | Object-side surface85 | -4.276 | 0.521 | 1.535 | 55.690 | -5.768 |
| | Image-side surface86 | 11.719 | 0.500 | | | |
| Filter 9 | Object-side surface95 | Infinity | 0.210 | 1.517 | 64.167 | |
| | Image-side surface96 | Infinity | 0.088 | | | |
| | Image plane 99 | Infinity | | | | |

Figure 12

| Surface | K | $a_4$ | $a_6$ | $a_8$ | $a_{10}$ |
|---|---|---|---|---|---|
| 15 | 1.273918E-01 | 7.649414E-04 | 1.065147E-04 | -2.185728E-05 | 4.508330E-05 |
| 16 | 0.000000E+00 | -5.402655E-03 | 2.859755E-03 | -7.979807E-04 | 2.207149E-04 |
| 25 | 1.991924E+00 | -1.170989E-02 | 4.556464E-03 | -1.276058E-03 | 4.831798E-04 |
| 26 | -4.454616E-01 | -3.843336E-03 | -1.533787E-03 | 3.567864E-03 | -2.324438E-03 |
| 35 | 0.000000E+00 | -6.748687E-03 | -2.745442E-03 | 7.352221E-04 | -3.493759E-04 |
| 36 | 0.000000E+00 | -5.748783E-03 | -2.850947E-03 | 3.005187E-04 | 6.646757E-05 |
| 45 | 0.000000E+00 | -1.407959E-02 | 1.406118E-03 | -2.066975E-03 | -1.265376E-03 |
| 46 | 0.000000E+00 | -2.381232E-02 | 1.404740E-02 | -1.129245E-02 | 5.322886E-03 |
| 55 | 0.000000E+00 | -3.543446E-02 | 1.562936E-02 | -6.130275E-03 | 1.553236E-03 |
| 56 | 0.000000E+00 | -3.471293E-02 | 1.162817E-02 | -5.595695E-03 | 1.728521E-03 |
| 65 | 0.000000E+00 | -1.111561E-02 | 8.982734E-03 | -5.618158E-03 | 1.719188E-03 |
| 66 | -2.943629E+00 | 1.611866E-02 | -8.636112E-03 | 3.205950E-03 | -9.352072E-04 |
| 75 | -3.082553E+01 | 1.057129E-02 | -7.358917E-03 | 1.650486E-03 | -2.977022E-04 |
| 76 | -1.274919E+01 | 3.894825E-03 | -2.945682E-03 | 3.549534E-04 | -5.353088E-06 |
| 85 | -6.442786E-01 | -7.048248E-03 | 7.319084E-04 | -2.072620E-04 | 6.045218E-05 |
| 86 | 9.086985E-01 | -9.011272E-03 | 6.014881E-04 | -6.678720E-05 | 6.523101E-06 |
| Surface | $a_{12}$ | $a_{14}$ | $a_{16}$ | $a_{18}$ | $a_{20}$ |
| 15 | -1.454102E-05 | 2.496793E-06 | -1.668904E-07 | | |
| 16 | -5.123596E-05 | 7.184086E-06 | -4.198764E-07 | | |
| 25 | -1.383477E-04 | 2.285145E-05 | -1.535130E-06 | | |
| 26 | 8.920278E-04 | -1.806035E-04 | 1.604298E-05 | | |
| 35 | 1.705560E-04 | -3.566751E-05 | 3.031433E-06 | | |
| 36 | -1.208446E-05 | 5.708712E-06 | -1.263044E-06 | | |
| 45 | 1.728495E-03 | -8.615104E-04 | 2.381626E-04 | -3.590047E-05 | 2.294393E-06 |
| 46 | -1.759726E-03 | 4.206686E-04 | -6.732600E-05 | 6.205872E-06 | -2.406631E-07 |
| 55 | -1.262103E-04 | -3.230685E-05 | 9.152187E-06 | -8.674163E-07 | 2.969354E-08 |
| 56 | -2.682924E-04 | 1.640998E-05 | 3.914785E-07 | -8.209978E-08 | 2.073333E-09 |
| 65 | -2.824324E-04 | 2.537623E-05 | -1.134024E-06 | 1.585240E-08 | 2.323950E-10 |
| 66 | 1.860907E-04 | -2.249652E-05 | 1.565750E-06 | -5.747135E-08 | 8.530180E-10 |
| 75 | 4.333768E-05 | -4.684552E-06 | 3.175825E-07 | -1.117441E-08 | 1.436010E-10 |
| 76 | -4.071653E-06 | 5.561278E-07 | -3.400291E-08 | 1.036843E-09 | -1.277300E-11 |
| 85 | -7.487766E-06 | 4.871696E-07 | -1.779310E-08 | 3.475830E-10 | -2.841000E-12 |
| 86 | -3.233425E-07 | 5.512268E-09 | 1.223510E-10 | -5.953000E-12 | 6.300000E-14 |

Figure 13

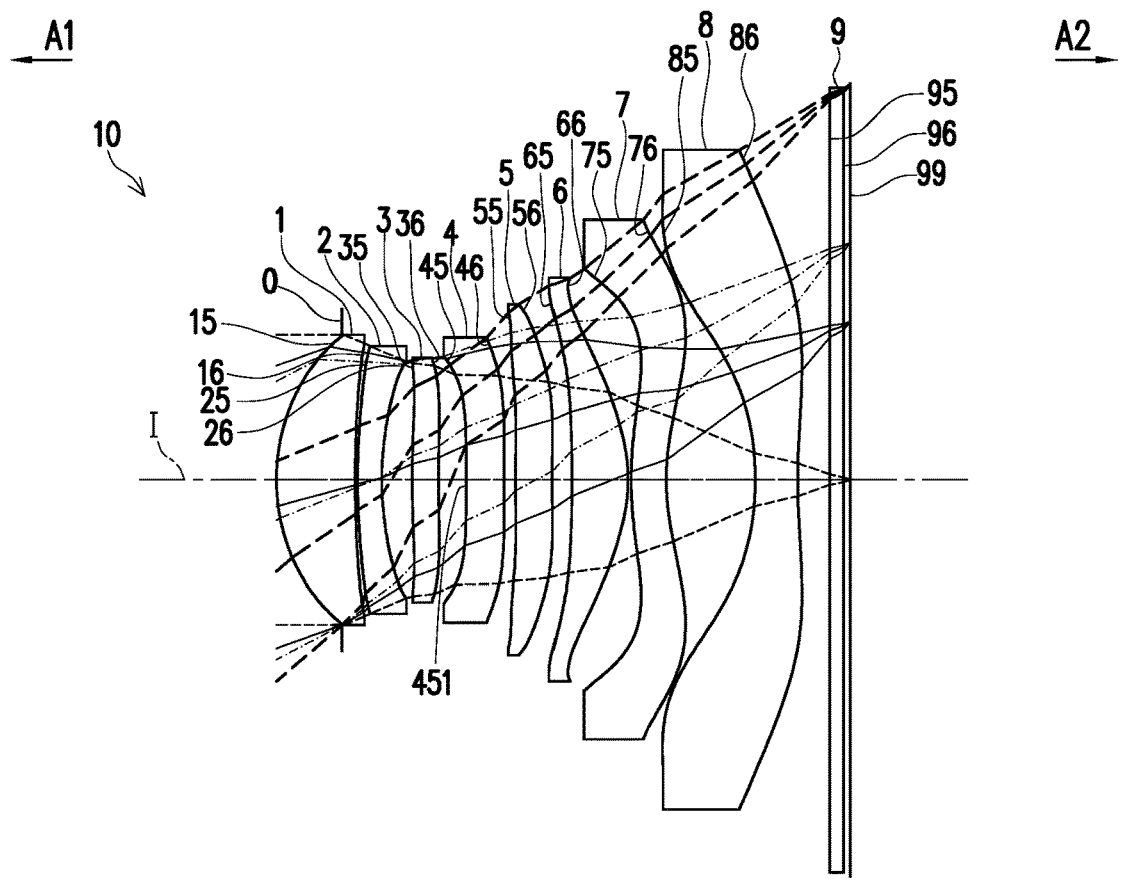
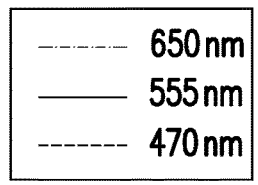
Figure 14
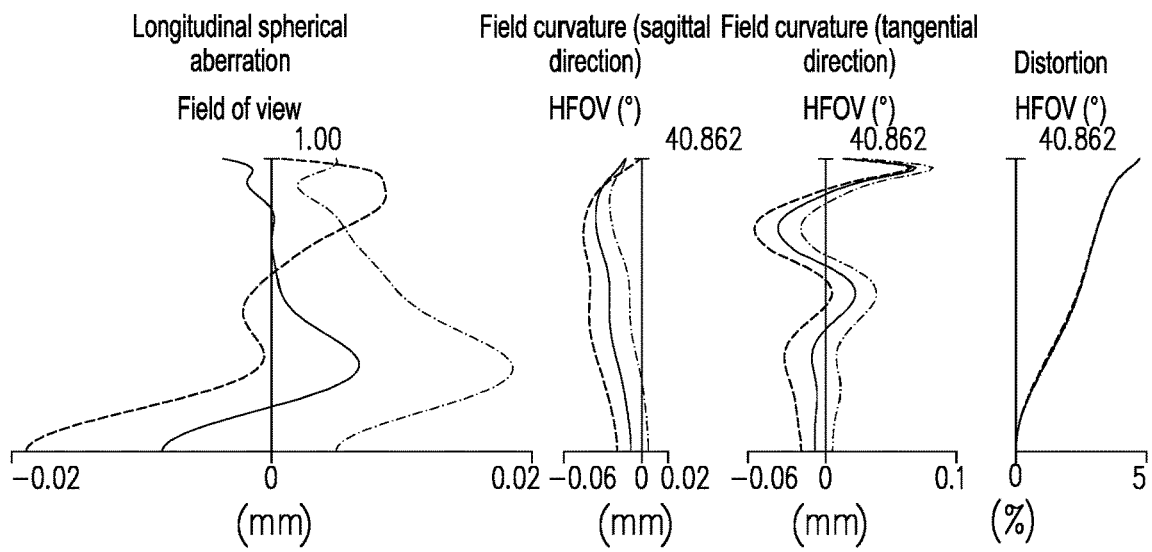
Figure 15A   Figure 15B Figure 15C Figure 15D

| Third embodiment | | | | | | |
|---|---|---|---|---|---|---|
| EFL=6.828 mm, HFOV=40.862 degrees, System length=8.998 mm, Fno=1.500, Image height=6.200 mm | | | | | | |
| Device | Surface | Radius of curvature (mm) | Thickness (mm) | Refractive index | Abbe number | Focal length (mm) |
| Object | | Infinity | Infinity | | | |
| Aperture0 | | Infinity | -1.030 | | | |
| First lens element 1 | Object-side surface15 | 3.173 | 1.236 | 1.545 | 55.987 | 6.946 |
| | Image-side surface16 | 16.700 | 0.039 | | | |
| Second lens element 2 | Object-side surface25 | 9.710 | 0.381 | 1.671 | 19.243 | -15.917 |
| | Image-side surface26 | 5.028 | 0.475 | | | |
| Third lens element 3 | Object-side surface35 | 13.805 | 0.417 | 1.671 | 19.243 | 44.871 |
| | Image-side surface36 | 24.980 | 0.436 | | | |
| Fourth lens element 4 | Object-side surface45 | -62.130 | 0.591 | 1.671 | 19.243 | -40.303 |
| | Image-side surface46 | 48.908 | 0.180 | | | |
| Fifth lens element 5 | Object-side surface55 | 17.127 | 0.576 | 1.545 | 55.987 | 1699.847 |
| | Image-side surface56 | 17.241 | 0.302 | | | |
| Sixth lens element 6 | Object-side surface65 | -33.677 | 0.882 | 1.545 | 55.987 | 5.187 |
| | Image-side surface66 | -2.638 | 0.049 | | | |
| Seventh lens element 7 | Object-side surface75 | 5.996 | 0.551 | 1.642 | 22.409 | -15.206 |
| | Image-side surface76 | 3.591 | 1.401 | | | |
| Eighth lens element 8 | Object-side surface85 | -4.550 | 0.667 | 1.535 | 55.690 | -5.911 |
| | Image-side surface86 | 11.043 | 0.500 | | | |
| Filter 9 | Object-side surface95 | Infinity | 0.210 | 1.517 | 64.167 | |
| | Image-side surface96 | Infinity | 0.106 | | | |
| | Image plane 99 | Infinity | | | | |

Figure 16

| Surface | K | $a_4$ | $a_6$ | $a_8$ | $a_{10}$ |
|---|---|---|---|---|---|
| 15 | 1.367766E-01 | 5.705138E-04 | 1.252713E-04 | -4.393929E-05 | 4.687660E-05 |
| 16 | 0.000000E+00 | -5.020925E-03 | 2.905828E-03 | -8.441325E-04 | 2.203478E-04 |
| 25 | 1.253814E+00 | -1.173328E-02 | 4.206187E-03 | -1.291843E-03 | 4.866906E-04 |
| 26 | -6.320790E-01 | -4.053582E-03 | -1.819904E-03 | 3.640868E-03 | -2.307573E-03 |
| 35 | 0.000000E+00 | -6.538781E-03 | -2.682325E-03 | 7.034547E-04 | -3.540662E-04 |
| 36 | 0.000000E+00 | -6.514116E-03 | -3.021231E-03 | 2.070117E-04 | 4.401921E-05 |
| 45 | 0.000000E+00 | -1.461754E-02 | 1.447642E-03 | -1.976131E-03 | -1.270147E-03 |
| 46 | 0.000000E+00 | -2.301234E-02 | 1.435275E-02 | -1.115858E-02 | 5.317730E-03 |
| 55 | 0.000000E+00 | -3.542056E-02 | 1.578720E-02 | -6.118544E-03 | 1.554692E-03 |
| 56 | 0.000000E+00 | -3.455527E-02 | 1.155130E-02 | -5.574705E-03 | 1.730067E-03 |
| 65 | 0.000000E+00 | -1.011607E-02 | 8.998399E-03 | -5.625367E-03 | 1.718755E-03 |
| 66 | -2.761663E+00 | 1.633006E-02 | -8.586111E-03 | 3.208956E-03 | -9.350388E-04 |
| 75 | -3.085738E+01 | 1.015462E-02 | -7.269608E-03 | 1.650144E-03 | -2.979844E-04 |
| 76 | -1.457123E+01 | 4.030517E-03 | -2.944029E-03 | 3.553883E-04 | -5.321578E-06 |
| 85 | -6.208410E-01 | -7.097193E-03 | 7.282988E-04 | -2.074007E-04 | 6.044967E-05 |
| 86 | 2.472050E-01 | -9.105857E-03 | 5.962603E-04 | -6.677309E-05 | 6.526170E-06 |
| Surface | $a_{12}$ | $a_{14}$ | $a_{16}$ | $a_{18}$ | $a_{20}$ |
| 15 | -1.444142E-05 | 2.409277E-06 | -1.569443E-07 | | |
| 16 | -5.000392E-05 | 7.364757E-06 | -4.565811E-07 | | |
| 25 | -1.378043E-04 | 2.286769E-05 | -1.537944E-06 | | |
| 26 | 8.847544E-04 | -1.820569E-04 | 1.674767E-05 | | |
| 35 | 1.691313E-04 | -3.581418E-05 | 3.382718E-06 | | |
| 36 | -1.124095E-05 | 6.727021E-06 | -1.241528E-06 | | |
| 45 | 1.724664E-03 | -8.612486E-04 | 2.383663E-04 | -3.589120E-05 | 2.300301E-06 |
| 46 | -1.764030E-03 | 4.203819E-04 | -6.718227E-05 | 6.246753E-06 | -2.482633E-07 |
| 55 | -1.263205E-04 | -3.238136E-05 | 9.139175E-06 | -8.679899E-07 | 2.985049E-08 |
| 56 | -2.683186E-04 | 1.638702E-05 | 3.884268E-07 | -8.260917E-08 | 1.979286E-09 |
| 65 | -2.824248E-04 | 2.537973E-05 | -1.133700E-06 | 1.587150E-08 | 2.326450E-10 |
| 66 | 1.860723E-04 | -2.249908E-05 | 1.565524E-06 | -5.745438E-08 | 8.598060E-10 |
| 75 | 4.332502E-05 | -4.684034E-06 | 3.177601E-07 | -1.115001E-08 | 1.464000E-10 |
| 76 | -4.070354E-06 | 5.561559E-07 | -3.400453E-08 | 1.036627E-09 | -1.278800E-11 |
| 85 | -7.487701E-06 | 4.871792E-07 | -1.779259E-08 | 3.475930E-10 | -2.842000E-12 |
| 86 | -3.232369E-07 | 5.514777E-09 | 1.223890E-10 | -5.954000E-12 | 6.200000E-14 |

Figure 17

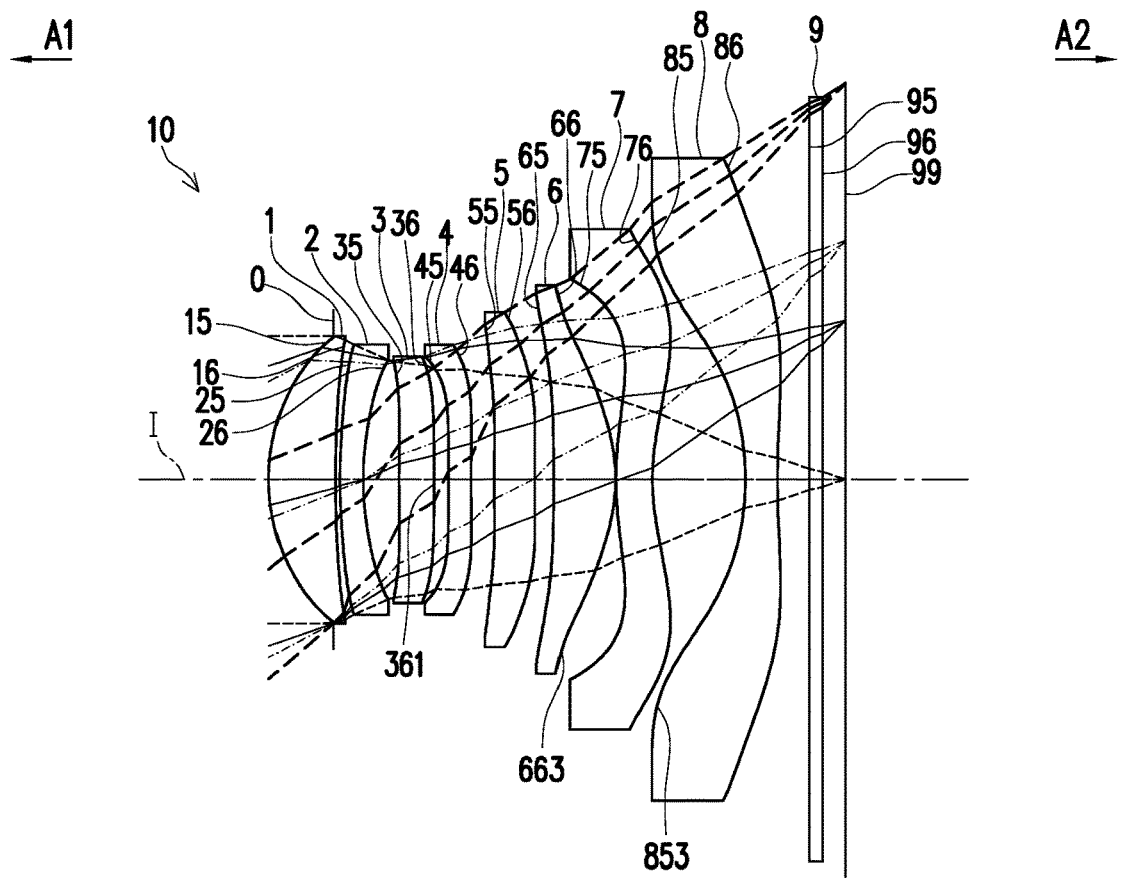
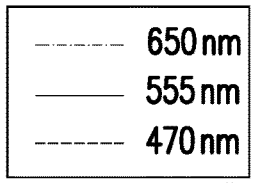
Figure 18
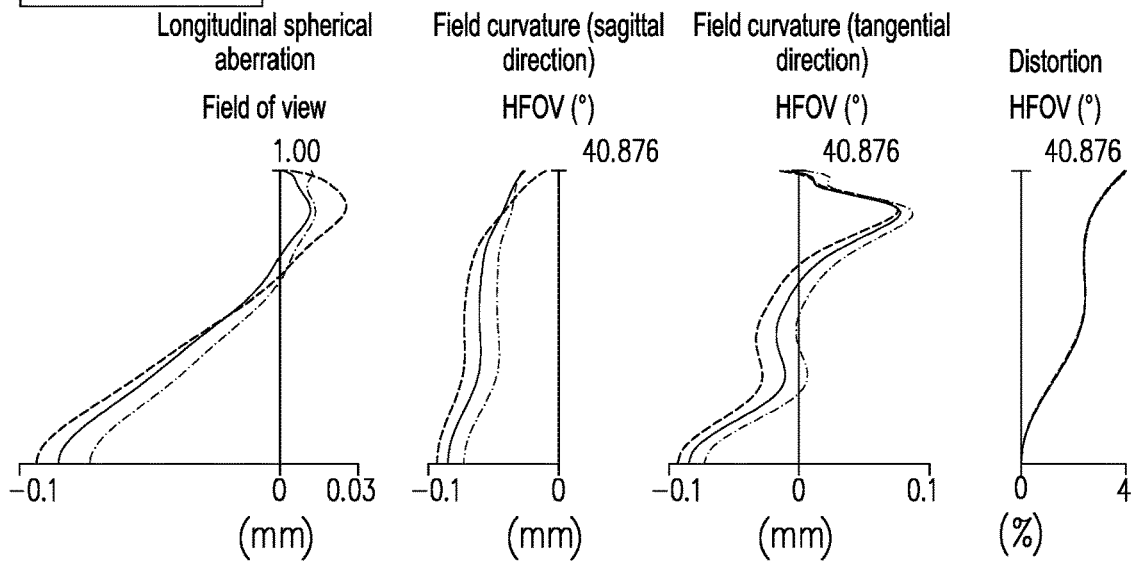
Figure 19A    Figure 19B    Figure 19C  Figure 19D

| Fourth embodiment | | | | | | |
|---|---|---|---|---|---|---|
| EFL=6.755 mm, HFOV=40.876 degrees, System length=9.025 mm, Fno=1.500, Image height=6.200 mm | | | | | | |
| Device | Surface | Radius of curvature (mm) | Thickness (mm) | Refractive index | Abbe number | Focal length (mm) |
| Object | | Infinity | Infinity | | | |
| Aperture0 | | Infinity | -1.009 | | | |
| First lens element 1 | Object-side surface15 | 3.178 | 1.040 | 1.545 | 55.987 | 6.926 |
| | Image-side surface16 | 17.572 | 0.072 | | | |
| Second lens element 2 | Object-side surface25 | 9.319 | 0.367 | 1.671 | 19.243 | -15.543 |
| | Image-side surface26 | 4.865 | 0.561 | | | |
| Third lens element 3 | Object-side surface35 | 45.174 | 0.548 | 1.671 | 19.243 | 55.779 |
| | Image-side surface36 | -230.160 | 0.225 | | | |
| Fourth lens element 4 | Object-side surface45 | 66.657 | 0.359 | 1.671 | 19.243 | -59.719 |
| | Image-side surface46 | 25.124 | 0.359 | | | |
| Fifth lens element 5 | Object-side surface55 | 19.331 | 0.636 | 1.545 | 55.987 | -499.005 |
| | Image-side surface56 | 17.841 | 0.301 | | | |
| Sixth lens element 6 | Object-side surface65 | -47.082 | 0.961 | 1.545 | 55.987 | 5.132 |
| | Image-side surface66 | -2.665 | 0.007 | | | |
| Seventh lens element 7 | Object-side surface75 | 5.641 | 0.571 | 1.642 | 22.409 | -15.681 |
| | Image-side surface76 | 3.482 | 1.459 | | | |
| Eighth lens element 8 | Object-side surface85 | -4.462 | 0.504 | 1.535 | 55.690 | -6.089 |
| | Image-side surface86 | 12.730 | 0.500 | | | |
| Filter 9 | Object-side surface95 | Infinity | 0.210 | 1.517 | 64.167 | |
| | Image-side surface96 | Infinity | 0.345 | | | |
| | Image plane 99 | Infinity | | | | |

Figure 20

| Surface | K | $a_4$ | $a_6$ | $a_8$ | $a_{10}$ |
|---|---|---|---|---|---|
| 15 | 1.460409E-01 | 6.836816E-04 | 7.976920E-05 | -1.694775E-05 | 4.636381E-05 |
| 16 | 0.000000E+00 | -4.986111E-03 | 2.866689E-03 | -7.952011E-04 | 2.194143E-04 |
| 25 | 9.624653E-01 | -1.184023E-02 | 4.525518E-03 | -1.289172E-03 | 4.758497E-04 |
| 26 | -5.912437E-01 | -3.997487E-03 | -1.478773E-03 | 3.557273E-03 | -2.336553E-03 |
| 35 | 0.000000E+00 | -6.279511E-03 | -2.502176E-03 | 6.848223E-04 | -3.708853E-04 |
| 36 | 0.000000E+00 | -4.786181E-03 | -3.151681E-03 | 1.163031E-04 | 4.847908E-05 |
| 45 | 0.000000E+00 | -1.522924E-02 | 9.926686E-04 | -2.191386E-03 | -1.279221E-03 |
| 46 | 0.000000E+00 | -2.436530E-02 | 1.386891E-02 | -1.130545E-02 | 5.322242E-03 |
| 55 | 0.000000E+00 | -3.513325E-02 | 1.561258E-02 | -6.145025E-03 | 1.551775E-03 |
| 56 | 0.000000E+00 | -3.525234E-02 | 1.156856E-02 | -5.587343E-03 | 1.730293E-03 |
| 65 | 0.000000E+00 | -1.034278E-02 | 9.052932E-03 | -5.616710E-03 | 1.719077E-03 |
| 66 | -2.897505E+00 | 1.620668E-02 | -8.617757E-03 | 3.208424E-03 | -9.350372E-04 |
| 75 | -4.155257E+01 | 1.009114E-02 | -7.362132E-03 | 1.651875E-03 | -2.977027E-04 |
| 76 | -1.795559E+01 | 3.991811E-03 | -2.942027E-03 | 3.551187E-04 | -5.339271E-06 |
| 85 | -6.530657E-01 | -6.991437E-03 | 7.313681E-04 | -2.073406E-04 | 6.044780E-05 |
| 86 | 1.629181E+00 | -9.141493E-03 | 6.081744E-04 | -6.659974E-05 | 6.526665E-06 |
| Surface | $a_{12}$ | $a_{14}$ | $a_{16}$ | $a_{18}$ | $a_{20}$ |
| 15 | -1.465874E-05 | 2.428039E-06 | -1.479505E-07 | | |
| 16 | -5.187194E-05 | 7.159622E-06 | -3.943644E-07 | | |
| 25 | -1.394918E-04 | 2.287094E-05 | -1.452983E-06 | | |
| 26 | 8.888245E-04 | -1.810493E-04 | 1.597793E-05 | | |
| 35 | 1.672152E-04 | -3.555942E-05 | 3.279938E-06 | | |
| 36 | -7.204149E-06 | 6.915064E-06 | -1.516888E-06 | | |
| 45 | 1.730753E-03 | -8.608005E-04 | 2.380884E-04 | -3.595277E-05 | 2.300374E-06 |
| 46 | -1.760610E-03 | 4.204713E-04 | -6.729857E-05 | 6.223232E-06 | -2.389037E-07 |
| 55 | -1.260391E-04 | -3.225916E-05 | 9.154886E-06 | -8.685173E-07 | 2.930678E-08 |
| 56 | -2.681723E-04 | 1.639856E-05 | 3.871762E-07 | -8.278055E-08 | 1.993342E-09 |
| 65 | -2.824466E-04 | 2.537488E-05 | -1.134062E-06 | 1.584825E-08 | 2.324980E-10 |
| 66 | 1.860943E-04 | -2.249733E-05 | 1.565620E-06 | -5.748253E-08 | 8.528280E-10 |
| 75 | 4.332624E-05 | -4.685947E-06 | 3.174755E-07 | -1.117996E-08 | 1.436480E-10 |
| 76 | -4.070720E-06 | 5.561760E-07 | -3.400100E-08 | 1.036895E-09 | -1.277300E-11 |
| 85 | -7.487964E-06 | 4.871618E-07 | -1.779336E-08 | 3.475770E-10 | -2.841000E-12 |
| 86 | -3.233155E-07 | 5.510339E-09 | 1.222060E-10 | -5.960000E-12 | 6.200000E-14 |

Figure 21

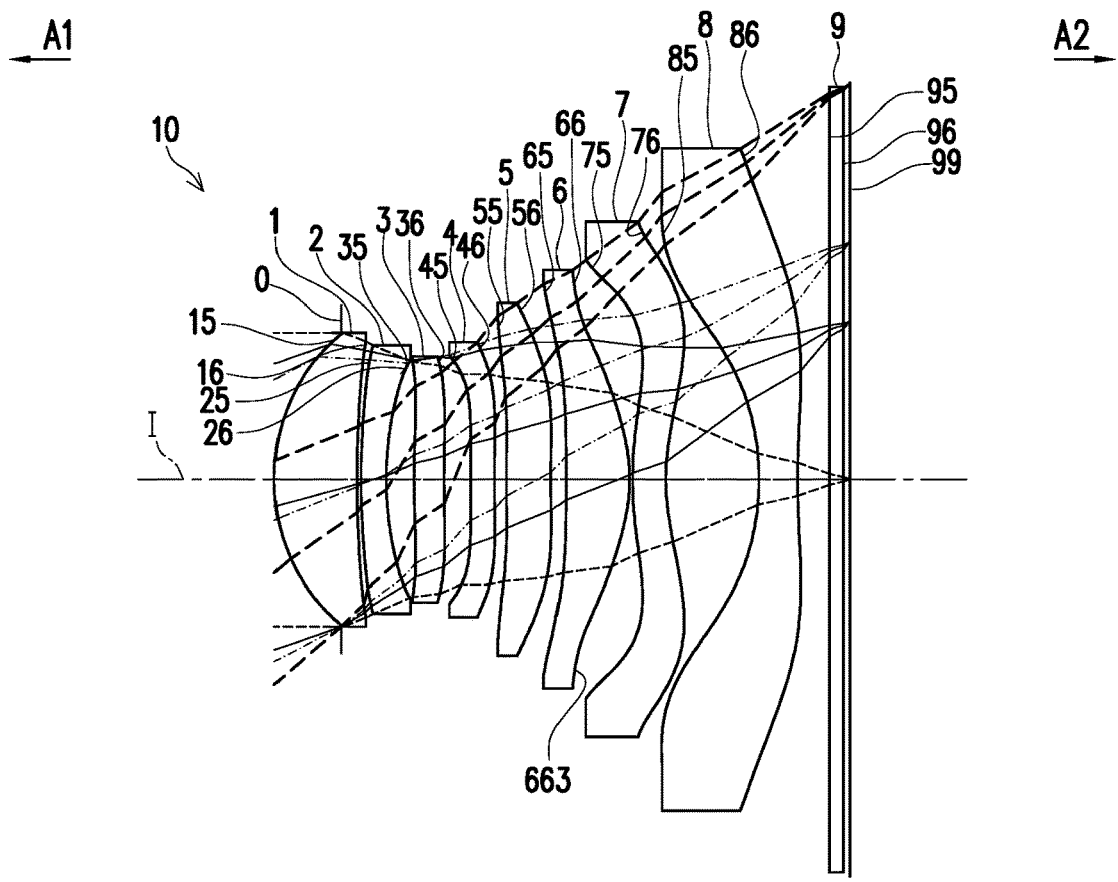
Figure 22
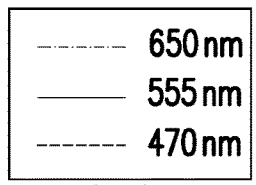
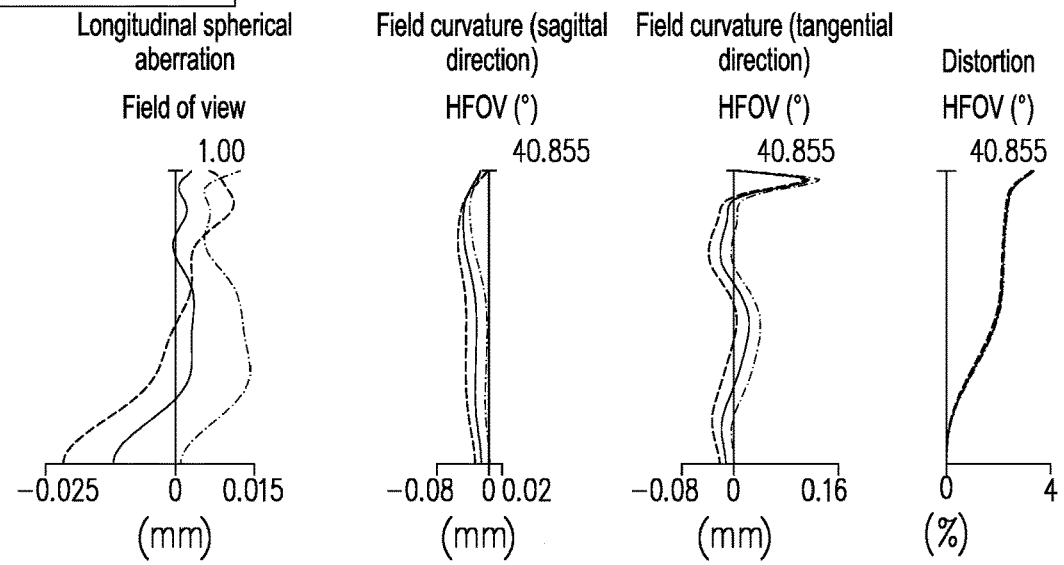
Figure 23A    Figure 23B    Figure 23C   Figure 23D

| Fifth embodiment |||||||
|---|---|---|---|---|---|---|
| EFL=6.917 mm, HFOV=40.855 degrees, System length=9.017 mm, Fno=1.500, Image height=6.200 mm |||||||
| Device | Surface | Radius of curvature (mm) | Thickness (mm) | Refractive index | Abbe number | Focal length (mm) |
| Object | | Infinity | Infinity | | | |
| Aperture0 | | Infinity | -1.051 | | | |
| First lens element 1 | Object-side surface15 | 3.143 | 1.296 | 1.545 | 55.987 | 6.848 |
| | Image-side surface16 | 16.791 | 0.063 | | | |
| Second lens element 2 | Object-side surface25 | 10.638 | 0.395 | 1.671 | 19.243 | -14.952 |
| | Image-side surface26 | 5.111 | 0.439 | | | |
| Third lens element 3 | Object-side surface35 | 16.478 | 0.470 | 1.671 | 19.243 | 48.138 |
| | Image-side surface36 | 32.919 | 0.421 | | | |
| Fourth lens element 4 | Object-side surface45 | 81.643 | 0.371 | 1.671 | 19.243 | -48.152 |
| | Image-side surface46 | 23.267 | 0.185 | | | |
| Fifth lens element 5 | Object-side surface55 | 19.355 | 0.699 | 1.545 | 55.987 | -499.000 |
| | Image-side surface56 | 17.841 | 0.235 | | | |
| Sixth lens element 6 | Object-side surface65 | -47.082 | 0.993 | 1.545 | 55.987 | 5.170 |
| | Image-side surface66 | -2.684 | 0.047 | | | |
| Seventh lens element 7 | Object-side surface75 | 5.880 | 0.522 | 1.642 | 22.409 | -14.379 |
| | Image-side surface76 | 3.478 | 1.461 | | | |
| Eighth lens element 8 | Object-side surface85 | -4.319 | 0.609 | 1.535 | 55.690 | -5.937 |
| | Image-side surface86 | 12.781 | 0.500 | | | |
| Filter 9 | Object-side surface95 | Infinity | 0.210 | 1.517 | 64.167 | |
| | Image-side surface96 | Infinity | 0.102 | | | |
| | Image plane 99 | Infinity | | | | |

Figure 24

| Surface | K | $a_4$ | $a_6$ | $a_8$ | $a_{10}$ |
|---|---|---|---|---|---|
| 15 | 1.026508E-01 | 5.987309E-04 | 1.742607E-05 | -3.148428E-05 | 4.537116E-05 |
| 16 | 0.000000E+00 | -5.602022E-03 | 2.861683E-03 | -8.003125E-04 | 2.193412E-04 |
| 25 | 2.582926E+00 | -1.162164E-02 | 4.492075E-03 | -1.296226E-03 | 4.784030E-04 |
| 26 | -3.392628E-01 | -3.745958E-03 | -1.448055E-03 | 3.551720E-03 | -2.338896E-03 |
| 35 | 0.000000E+00 | -6.492285E-03 | -2.683603E-03 | 6.911749E-04 | -3.670659E-04 |
| 36 | 0.000000E+00 | -5.361324E-03 | -2.904557E-03 | 2.224983E-04 | 5.274590E-05 |
| 45 | 0.000000E+00 | -1.455758E-02 | 1.247973E-03 | -2.092572E-03 | -1.269901E-03 |
| 46 | 0.000000E+00 | -2.454668E-02 | 1.371018E-02 | -1.129964E-02 | 5.336755E-03 |
| 55 | 0.000000E+00 | -3.547105E-02 | 1.565634E-02 | -6.139156E-03 | 1.551861E-03 |
| 56 | 0.000000E+00 | -3.464210E-02 | 1.148667E-02 | -5.601785E-03 | 1.729057E-03 |
| 65 | 0.000000E+00 | -1.082546E-02 | 9.046051E-03 | -5.615733E-03 | 1.719090E-03 |
| 66 | -3.461658E+00 | 1.622424E-02 | -8.642251E-03 | 3.205869E-03 | -9.351656E-04 |
| 75 | -3.459481E+01 | 1.082410E-02 | -7.363277E-03 | 1.652814E-03 | -2.973601E-04 |
| 76 | -1.649797E+01 | 3.833596E-03 | -2.945276E-03 | 3.549524E-04 | -5.351208E-06 |
| 85 | -6.471926E-01 | -7.040549E-03 | 7.319363E-04 | -2.072492E-03 | 6.045363E-05 |
| 86 | 1.319672E+00 | -9.024915E-03 | 6.038595E-04 | -6.672360E-05 | 6.524660E-06 |
| Surface | $a_{12}$ | $a_{14}$ | $a_{16}$ | $a_{18}$ | $a_{20}$ |
| 15 | -1.480963E-05 | 2.430470E-06 | -1.572071E-07 | | |
| 16 | -5.142004E-05 | 7.200377E-06 | -4.101226E-07 | | |
| 25 | -1.389590E-04 | 2.285858E-05 | -1.478778E-06 | | |
| 26 | 8.894043E-04 | -1.809213E-04 | 1.609042E-05 | | |
| 35 | 1.680982E-04 | -3.564068E-05 | 3.211388E-06 | | |
| 36 | -1.310781E-05 | 5.661377E-06 | -1.056252E-06 | | |
| 45 | 1.728521E-03 | -8.610868E-04 | 2.383227E-04 | -3.587220E-05 | 2.290128E-06 |
| 46 | -1.756983E-03 | 4.207423E-04 | -6.739664E-05 | 6.194889E-06 | -2.360279E-07 |
| 55 | -1.261940E-04 | -3.227653E-05 | 9.156797E-06 | -8.673437E-07 | 2.954943E-08 |
| 56 | -2.681838E-04 | 1.641800E-05 | 3.912274E-07 | -8.228673E-08 | 2.035206E-09 |
| 65 | -2.824585E-04 | 2.537344E-05 | -1.134249E-06 | 1.584285E-08 | 2.331840E-10 |
| 66 | 1.860972E-04 | -2.249582E-05 | 1.565820E-06 | -5.746422E-08 | 8.537450E-10 |
| 75 | 4.336855E-05 | -4.682199E-06 | 3.177485E-07 | -1.116343E-08 | 1.442640E-10 |
| 76 | -4.071304E-06 | 5.561620E-07 | -3.400028E-08 | 1.037026E-09 | -1.276100E-11 |
| 85 | -7.487669E-06 | 4.871743E-07 | -1.779296E-08 | 3.475820E-10 | -2.842000E-12 |
| 86 | -3.233070E-07 | 5.512986E-09 | 1.223620E-10 | -5.953000E-12 | 6.300000E-14 |

Figure 25

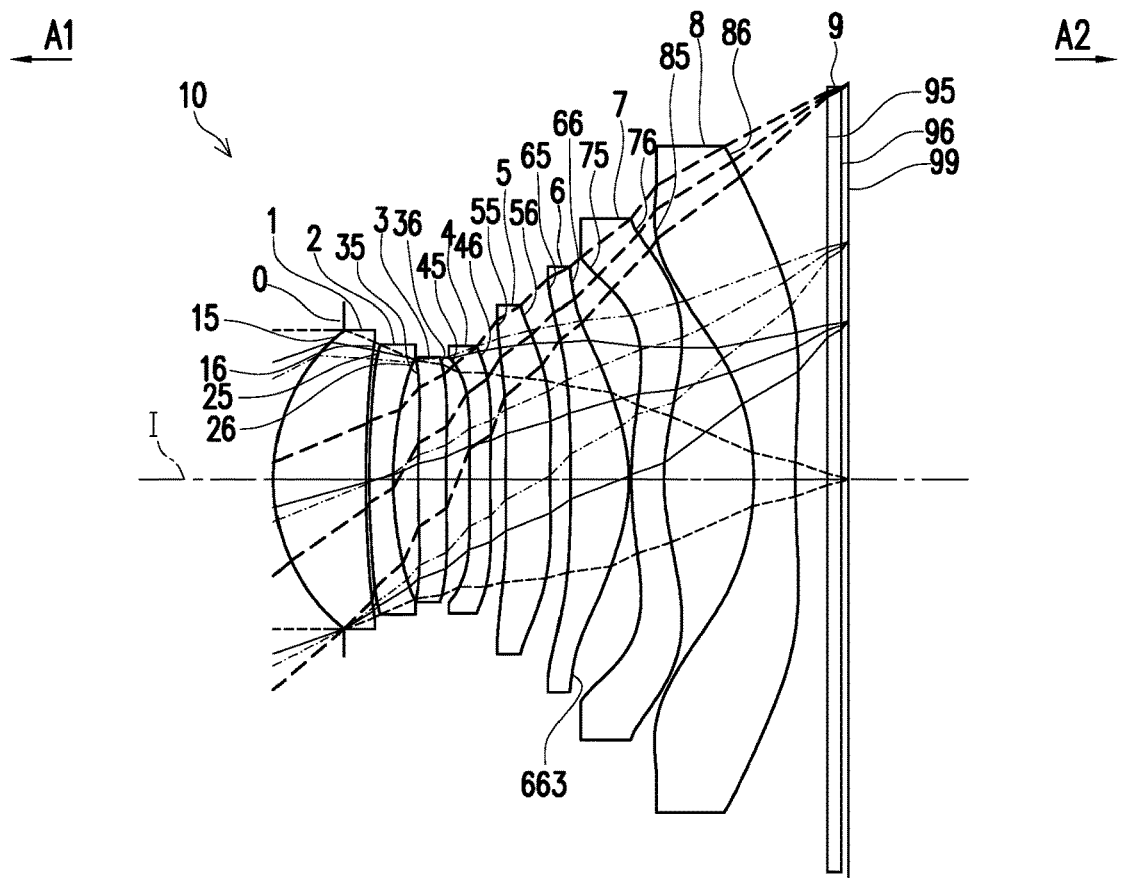
Figure 26
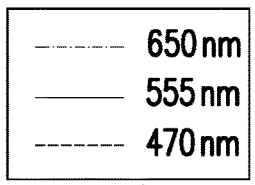
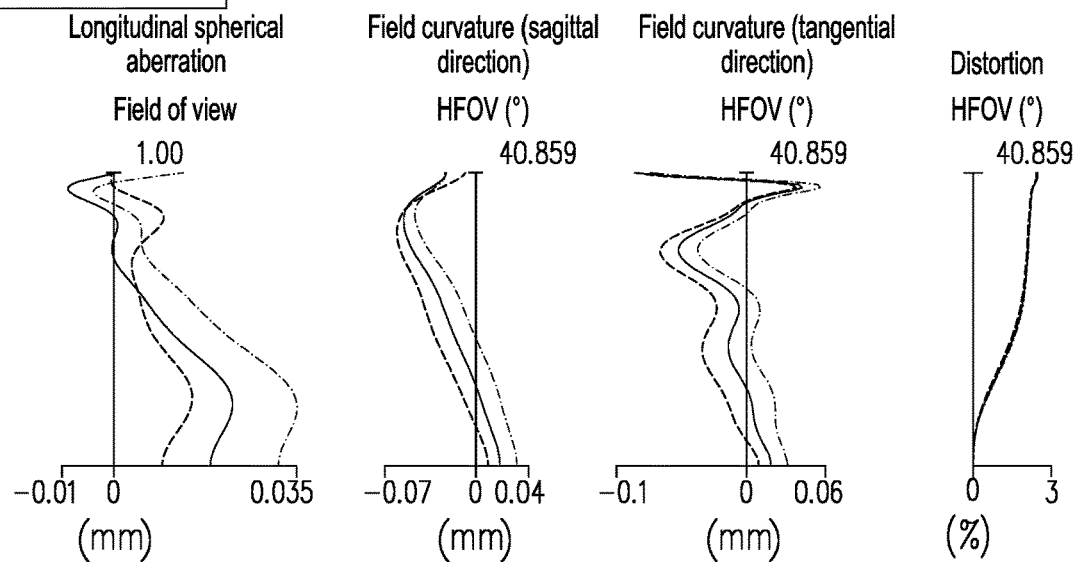
Figure 27A  Figure 27B  Figure 27C  Figure 27D

| Sixth embodiment |||||||
|---|---|---|---|---|---|---|
| EFL=7.026 mm, HFOV=40.859 degrees, System length=8.992 mm, Fno=1.500, Image height=6.200 mm |||||||
| Device | Surface | Radius of curvature (mm) | Thickness (mm) | Refractive index | Abbe number | Focal length (mm) |
| Object | | Infinity | Infinity | | | |
| Aperture0 | | Infinity | -1.098 | | | |
| First lens element 1 | Object-side surface15 | 3.149 | 1.444 | 1.545 | 55.987 | 6.790 |
| | Image-side surface16 | 17.479 | 0.051 | | | |
| Second lens element 2 | Object-side surface25 | 12.211 | 0.377 | 1.671 | 19.243 | -14.994 |
| | Image-side surface26 | 5.476 | 0.389 | | | |
| Third lens element 3 | Object-side surface35 | 16.041 | 0.441 | 1.671 | 19.243 | 52.074 |
| | Image-side surface36 | 29.086 | 0.365 | | | |
| Fourth lens element 4 | Object-side surface45 | 52.305 | 0.326 | 1.671 | 19.243 | -48.512 |
| | Image-side surface46 | 20.134 | 0.239 | | | |
| Fifth lens element 5 | Object-side surface55 | 19.355 | 0.700 | 1.545 | 55.987 | -499.004 |
| | Image-side surface56 | 17.841 | 0.309 | | | |
| Sixth lens element 6 | Object-side surface65 | -47.082 | 0.916 | 1.545 | 55.987 | 5.171 |
| | Image-side surface66 | -2.683 | 0.039 | | | |
| Seventh lens element 7 | Object-side surface75 | 5.959 | 0.510 | 1.642 | 22.409 | -14.042 |
| | Image-side surface76 | 3.478 | 1.408 | | | |
| Eighth lens element 8 | Object-side surface85 | -4.335 | 0.651 | 1.535 | 55.690 | -5.947 |
| | Image-side surface86 | 12.777 | 0.500 | | | |
| Filter 9 | Object-side surface95 | Infinity | 0.210 | 1.517 | 64.167 | |
| | Image-side surface96 | Infinity | 0.115 | | | |
| | Image plane 99 | Infinity | | | | |

Figure 28

| Surface | K | $a_4$ | $a_6$ | $a_8$ | $a_{10}$ |
|---|---|---|---|---|---|
| 15 | 1.009285E-01 | 6.156789E-04 | 1.479066E-06 | -3.117661E-05 | 4.433198E-05 |
| 16 | 0.000000E+00 | -5.372261E-03 | 2.875664E-03 | -8.080754E-04 | 2.194709E-04 |
| 25 | 2.624021E+00 | -1.163288E-02 | 4.529743E-03 | -1.281835E-03 | 4.787814E-04 |
| 26 | -7.983335E-01 | -4.183052E-03 | -1.534728E-03 | 3.545101E-03 | -2.333410E-03 |
| 35 | 0.000000E+00 | -6.764592E-03 | -2.786647E-03 | 6.836080E-04 | -3.598736E-04 |
| 36 | 0.000000E+00 | -5.394363E-03 | -2.988729E-03 | 2.151274E-04 | 5.779623E-05 |
| 45 | 0.000000E+00 | -1.495069E-02 | 1.110587E-03 | -2.126180E-03 | -1.272145E-03 |
| 46 | 0.000000E+00 | -2.437433E-02 | 1.382765E-02 | -1.129549E-02 | 5.332592E-03 |
| 55 | 0.000000E+00 | -3.529000E-02 | 1.564069E-02 | -6.139060E-03 | 1.551864E-03 |
| 56 | 0.000000E+00 | -3.502499E-02 | 1.152574E-02 | -5.598287E-03 | 1.729255E-03 |
| 65 | 0.000000E+00 | -1.073732E-02 | 9.030887E-03 | -5.616725E-03 | 1.719085E-03 |
| 66 | -3.388072E+00 | 1.599082E-02 | -8.651648E-03 | 3.206130E-03 | -9.351023E-04 |
| 75 | -3.971476E+01 | 1.092029E-02 | -7.365119E-03 | 1.652140E-03 | -2.974028E-04 |
| 76 | -1.719057E+01 | 3.784287E-03 | -2.948010E-03 | 3.548183E-04 | -5.358163E-06 |
| 85 | -6.460039E-01 | -7.029548E-03 | 7.313753E-04 | -2.072909E-04 | 6.045139E-05 |
| 86 | 4.324935E-01 | -9.201791E-03 | 6.036944E-04 | -6.671682E-05 | 6.524818E-06 |
| Surface | $a_{12}$ | $a_{14}$ | $a_{16}$ | $a_{18}$ | $a_{20}$ |
| 15 | -1.473093E-05 | 2.441986E-06 | -1.565336E-07 | | |
| 16 | -5.103319E-05 | 7.263933E-06 | -4.197830E-07 | | |
| 25 | -1.392572E-04 | 2.282779E-05 | -1.456762E-06 | | |
| 26 | 8.891469E-04 | -1.812378E-04 | 1.601549E-05 | | |
| 35 | 1.709969E-04 | -3.531742E-05 | 2.976188E-06 | | |
| 36 | -1.107520E-05 | 5.797920E-06 | -1.268878E-06 | | |
| 45 | 1.729336E-03 | -8.608433E-04 | 2.383350E-04 | -3.588430E-05 | 2.284886E-06 |
| 46 | -1.757657E-03 | 4.208052E-04 | -6.735226E-05 | 6.201875E-06 | -2.372010E-07 |
| 55 | -1.262354E-04 | -3.228478E-05 | 9.156327E-06 | -8.672425E-07 | 2.958060E-08 |
| 56 | -2.681649E-04 | 1.642161E-05 | 3.919441E-07 | -8.216225E-08 | 2.055214E-09 |
| 65 | -2.824525E-04 | 2.537436E-05 | -1.134153E-06 | 1.585129E-08 | 2.336780E-10 |
| 66 | 1.861036E-04 | -2.249534E-05 | 1.565842E-06 | -5.746514E-08 | 8.533410E-10 |
| 75 | 4.336714E-05 | -4.682179E-06 | 3.177551E-07 | -1.116278E-08 | 1.443100E-10 |
| 76 | -4.071647E-06 | 5.561468E-07 | -3.400086E-08 | 1.037008E-09 | -1.276200E-11 |
| 85 | -7.487767E-06 | 4.871711E-07 | -1.779300E-08 | 3.475860E-10 | -2.841000E-12 |
| 86 | -3.233058E-07 | 5.512842E-09 | 1.223490E-10 | -5.954000E-12 | 6.200000E-14 |

Figure 29

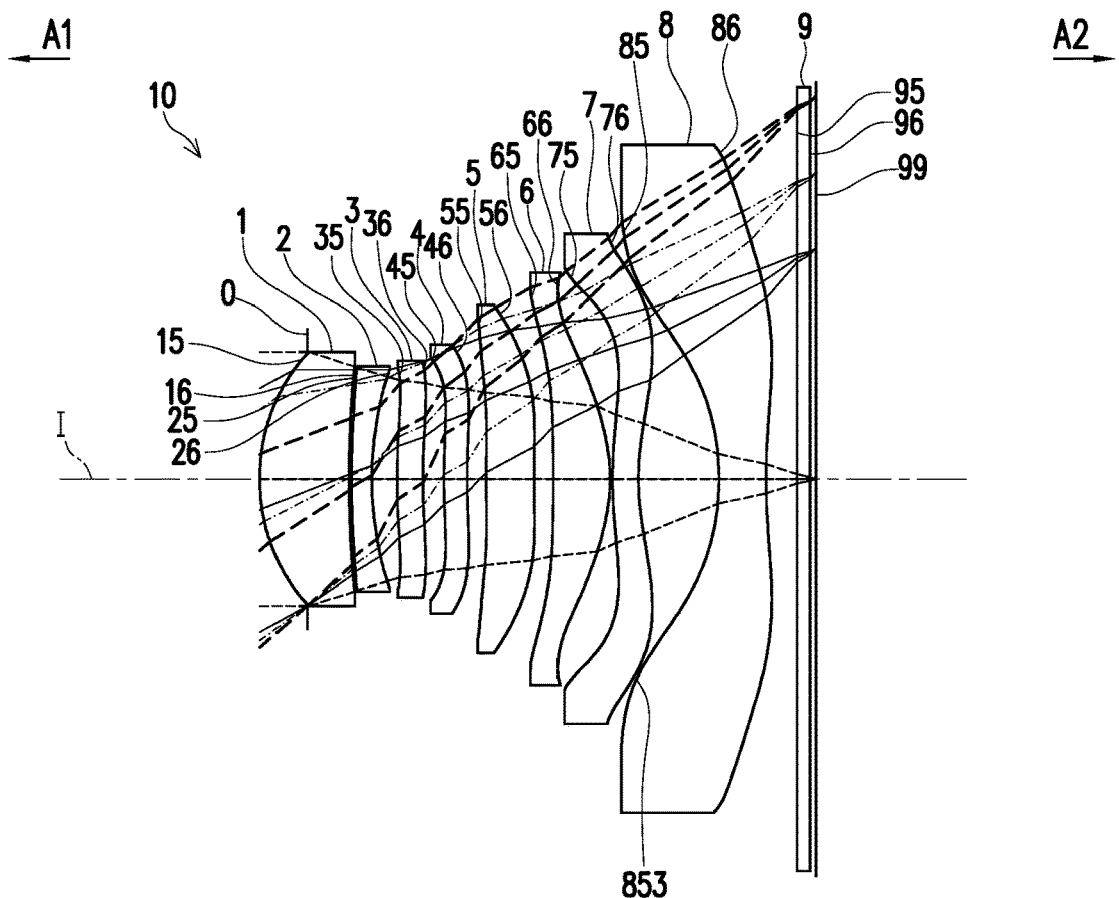
Figure 30
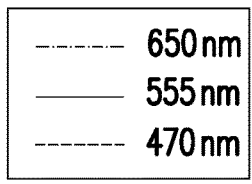
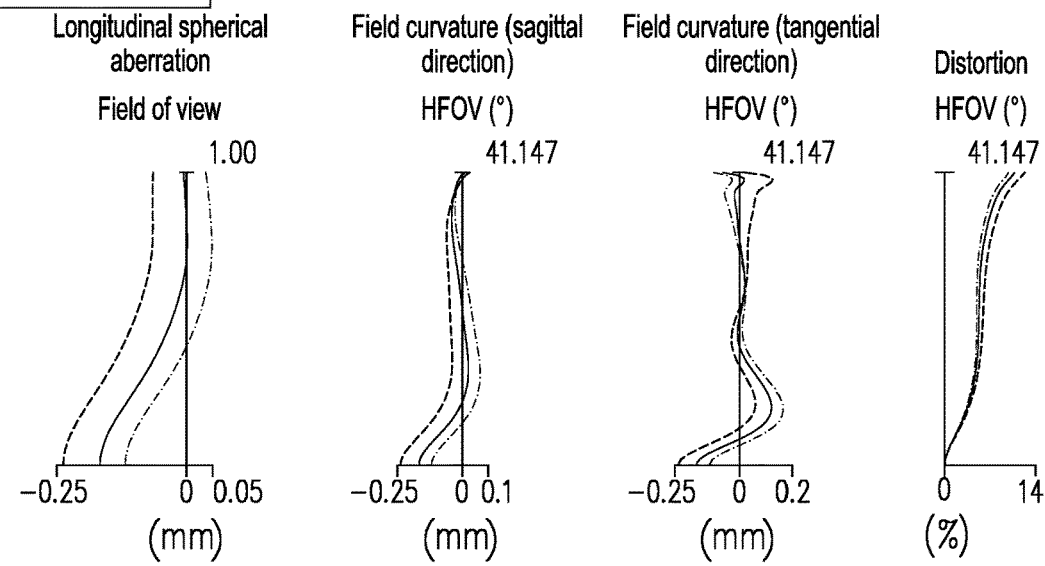
Figure 31A  Figure 31B  Figure 31C  Figure 31D

| Seventh embodiment ||||||
|---|---|---|---|---|---|
| EFL=6.162 mm, HFOV=41.147 degrees, System length=8.997 mm, Fno=1.500, Image height=6.200 mm ||||||
| Device | Surface | Radius of curvature (mm) | Thickness (mm) | Refractive index | Abbe number | Focal length (mm) |
| Object | | Infinity | Infinity | | | |
| Aperture0 | | Infinity | -0.766 | | | |
| First lens element 1 | Object-side surface15 | 3.218 | 1.440 | 1.545 | 55.987 | 6.996 |
| | Image-side surface16 | 17.141 | 0.040 | | | |
| Second lens element 2 | Object-side surface25 | 12.732 | 0.330 | 1.671 | 19.243 | -13.802 |
| | Image-side surface26 | 5.335 | 0.408 | | | |
| Third lens element 3 | Object-side surface35 | 10.303 | 0.421 | 1.671 | 19.243 | 102.772 |
| | Image-side surface36 | 11.892 | 0.338 | | | |
| Fourth lens element 4 | Object-side surface45 | 11.659 | 0.378 | 1.671 | 19.243 | 397.310 |
| | Image-side surface46 | 12.028 | 0.306 | | | |
| Fifth lens element 5 | Object-side surface55 | 19.385 | 0.779 | 1.545 | 55.987 | -499.000 |
| | Image-side surface56 | 17.841 | 0.309 | | | |
| Sixth lens element 6 | Object-side surface65 | -47.082 | 0.911 | 1.671 | 19.243 | 4.457 |
| | Image-side surface66 | -2.860 | 0.040 | | | |
| Seventh lens element 7 | Object-side surface75 | 5.672 | 0.417 | 1.545 | 55.987 | -17.636 |
| | Image-side surface76 | 3.477 | 1.305 | | | |
| Eighth lens element 8 | Object-side surface85 | -4.309 | 0.766 | 1.535 | 55.690 | -5.448 |
| | Image-side surface86 | 9.685 | 0.500 | | | |
| Filter 9 | Object-side surface95 | Infinity | 0.210 | 1.517 | 64.167 | |
| | Image-side surface96 | Infinity | 0.099 | | | |
| | Image plane 99 | Infinity | | | | |

Figure 32

| Surface | K | $a_4$ | $a_6$ | $a_8$ | $a_{10}$ |
|---|---|---|---|---|---|
| 15 | 1.163199E-01 | 9.729896E-04 | 3.809189E-05 | -1.215900E-05 | 4.347551E-05 |
| 16 | 0.000000E+00 | -5.316182E-03 | 2.914574E-03 | -8.053720E-04 | 2.226098E-04 |
| 25 | -2.584879E+00 | -1.194220E-02 | 4.474189E-03 | -1.266398E-03 | 4.806093E-04 |
| 26 | -9.089090E-01 | -4.754709E-03 | -1.184695E-03 | 3.524827E-03 | -2.357351E-03 |
| 35 | 0.000000E+00 | -6.692497E-03 | -2.878979E-03 | 6.663511E-04 | -3.819153E-04 |
| 36 | 0.000000E+00 | -5.595075E-03 | -2.884696E-03 | 2.390989E-04 | 4.904860E-05 |
| 45 | 0.000000E+00 | -1.506072E-02 | 1.491174E-03 | -2.064190E-03 | -1.276839E-03 |
| 46 | 0.000000E+00 | -2.439622E-02 | 1.365889E-02 | -1.132166E-02 | 5.328056E-03 |
| 55 | 0.000000E+00 | -3.476463E-02 | 1.569025E-02 | -6.138017E-03 | 1.551226E-03 |
| 56 | 0.000000E+00 | -3.555009E-02 | 1.147374E-02 | -5.604304E-03 | 1.728542E-03 |
| 65 | 0.000000E+00 | -1.104547E-02 | 9.005332E-03 | -5.618044E-03 | 1.719044E-03 |
| 66 | -3.050044E+00 | 1.607060E-02 | -8.636077E-03 | 3.207292E-03 | -9.349941E-04 |
| 75 | -1.478927E+02 | 1.124909E-02 | -7.380351E-03 | 1.653292E-03 | -2.972471E-04 |
| 76 | -2.714021E+01 | 3.796197E-03 | -2.944934E-03 | 3.550156E-04 | -5.341988E-06 |
| 85 | -6.447110E-01 | -7.030584E-03 | 7.309797E-04 | -2.073078E-04 | 6.045073E-05 |
| 86 | 4.070460E-01 | -9.171754E-03 | 6.024695E-04 | -6.674906E-05 | 6.524018E-06 |
| Surface | $a_{12}$ | $a_{14}$ | $a_{16}$ | $a_{18}$ | $a_{20}$ |
| 15 | -1.454169E-05 | 2.506258E-06 | -1.389042E-07 | | |
| 16 | -4.928152E-05 | 7.533993E-06 | -6.310824E-07 | | |
| 25 | -1.416715E-04 | 2.251366E-05 | -1.384811E-06 | | |
| 26 | 8.853634E-04 | -1.808033E-04 | 1.585752E-05 | | |
| 35 | 1.635842E-04 | -3.672651E-05 | 2.960356E-06 | | |
| 36 | -1.419146E-05 | 4.546906E-06 | -7.035473E-07 | | |
| 45 | 1.726062E-03 | -8.613204E-04 | 2.383649E-04 | -3.586312E-05 | 2.281601E-06 |
| 46 | -1.758558E-03 | 4.205325E-04 | -6.740911E-05 | 6.195330E-06 | -2.359413E-07 |
| 55 | -1.263945E-04 | -3.230651E-05 | 9.155408E-06 | -8.675288E-07 | 2.962925E-08 |
| 56 | -2.682387E-04 | 1.641639E-05 | 3.913859E-07 | -8.225648E-08 | 2.035064E-09 |
| 65 | -2.824487E-04 | 2.537531E-05 | -1.133990E-06 | 1.587067E-08 | 2.332060E-10 |
| 66 | 1.861121E-04 | -2.249455E-05 | 1.565898E-06 | -5.746115E-08 | 8.536670E-10 |
| 75 | 4.337821E-05 | -4.681592E-06 | 3.177838E-07 | -1.116129E-08 | 1.444880E-10 |
| 76 | -4.070475E-06 | 5.562196E-07 | -3.399689E-08 | 1.037200E-09 | -1.275400E-11 |
| 85 | -7.487801E-06 | 4.871680E-07 | -1.779329E-08 | 3.475610E-10 | -2.843000E-12 |
| 86 | -3.233269E-07 | 5.512280E-09 | 1.223370E-10 | -5.954000E-12 | 6.200000E-14 |

Figure 33

| Conditional expression | First embodiment | Second embodiment | Third embodiment | Fourth embodiment | Fifth embodiment | Sixth embodiment | Seventh embodiment |
|---|---|---|---|---|---|---|---|
| T1 | 1.385 | 1.052 | 1.236 | 1.040 | 1.296 | 1.444 | 1.440 |
| G12 | 0.043 | 0.086 | 0.039 | 0.072 | 0.063 | 0.051 | 0.040 |
| T2 | 0.345 | 0.342 | 0.381 | 0.367 | 0.395 | 0.377 | 0.330 |
| G23 | 0.412 | 0.438 | 0.475 | 0.561 | 0.439 | 0.389 | 0.408 |
| T3 | 0.462 | 0.522 | 0.417 | 0.548 | 0.470 | 0.441 | 0.421 |
| G34 | 0.419 | 0.497 | 0.436 | 0.225 | 0.421 | 0.365 | 0.338 |
| T4 | 0.457 | 0.515 | 0.591 | 0.359 | 0.371 | 0.326 | 0.378 |
| G45 | 0.216 | 0.217 | 0.180 | 0.359 | 0.185 | 0.239 | 0.306 |
| T5 | 0.771 | 0.723 | 0.576 | 0.636 | 0.699 | 0.700 | 0.779 |
| G56 | 0.311 | 0.338 | 0.302 | 0.301 | 0.235 | 0.309 | 0.309 |
| T6 | 0.917 | 0.846 | 0.882 | 0.961 | 0.993 | 0.916 | 0.911 |
| G67 | 0.015 | 0.107 | 0.049 | 0.007 | 0.047 | 0.039 | 0.040 |
| T7 | 0.452 | 0.526 | 0.551 | 0.571 | 0.522 | 0.510 | 0.417 |
| G78 | 1.346 | 1.472 | 1.401 | 1.459 | 1.461 | 1.408 | 1.305 |
| T8 | 0.496 | 0.521 | 0.667 | 0.504 | 0.609 | 0.651 | 0.766 |
| G8F | 0.500 | 0.500 | 0.500 | 0.500 | 0.500 | 0.500 | 0.500 |
| TF | 0.210 | 0.210 | 0.210 | 0.210 | 0.210 | 0.210 | 0.210 |
| GFP | 0.213 | 0.088 | 0.106 | 0.345 | 0.102 | 0.115 | 0.099 |
| BFL | 0.923 | 0.798 | 0.816 | 1.055 | 0.812 | 0.825 | 0.809 |
| EFL | 6.525 | 6.673 | 6.828 | 6.755 | 6.917 | 7.026 | 6.162 |
| TTL | 8.972 | 9.000 | 8.998 | 9.025 | 9.017 | 8.992 | 8.997 |
| TL | 8.049 | 8.202 | 8.182 | 7.970 | 8.206 | 8.167 | 8.188 |
| ALT | 5.286 | 5.046 | 5.301 | 4.986 | 5.355 | 5.366 | 5.441 |
| AAG | 2.762 | 3.156 | 2.881 | 2.984 | 2.851 | 2.801 | 2.747 |
| ImgH | 6.200 | 6.200 | 6.200 | 6.200 | 6.200 | 6.200 | 6.200 |

Figure 34

| Conditional expression | First embodiment | Second embodiment | Third embodiment | Fourth embodiment |
|---|---|---|---|---|
| (V2+V3+V4+V6)/V7 | 3.435 | 5.075 | 5.075 | 5.075 |
| (V2+V3+V4+V8)/V7 | 5.061 | 5.061 | 5.061 | 5.061 |
| (G45+T5+G56)/(G12+T3) | 2.569 | 2.100 | 2.321 | 2.090 |
| (T5+T6)/(T2+T4) | 2.104 | 1.830 | 1.500 | 2.202 |
| (T1+G78)/(G12+T2+G23) | 3.414 | 2.913 | 2.946 | 2.500 |
| (T7+G78+T8)/(G45+G56+G67) | 4.233 | 3.800 | 4.939 | 3.800 |
| (G23+T3+G34)/T8 | 2.606 | 2.800 | 1.992 | 2.649 |
| (T3+G34+T4)/(G45+G56) | 2.538 | 2.763 | 2.998 | 1.717 |
| EFL/(G23+G34+T4) | 5.064 | 4.600 | 4.546 | 5.900 |
| AAG/(T1+G45) | 1.725 | 2.487 | 2.035 | 2.133 |
| V4+V5+V6 | 94.473 | 131.217 | 131.217 | 131.217 |
| ALT/(T2+T4+G45) | 5.191 | 4.696 | 4.601 | 4.600 |
| (T8+BFL)/G56 | 4.560 | 3.900 | 4.918 | 5.181 |
| TL/(T7+BFL) | 5.852 | 6.199 | 5.986 | 4.900 |
| T6/(G56+G67) | 2.813 | 1.900 | 2.520 | 3.116 |
| (T6+T8)/T2 | 4.099 | 4.000 | 4.063 | 3.995 |
| (T1+G12)/(T2+G23) | 1.887 | 1.459 | 1.488 | 1.199 |
| ImgH/(T2+G23+T3) | 5.084 | 4.760 | 4.868 | 4.202 |
| (T3+G34+T4)/G23 | 3.248 | 3.500 | 3.039 | 2.018 |

Figure 35

| Conditional expression | Fifth embodiment | Sixth embodiment | Seventh embodiment |
|---|---|---|---|
| (V2+V3+V4+V6)/V7 | 5.075 | 5.075 | 1.375 |
| (V2+V3+V4+V8)/V7 | 5.061 | 5.061 | 2.026 |
| (G45+T5+G56)/(G12+T3) | 2.100 | 2.531 | 3.023 |
| (T5+T6)/(T2+T4) | 2.210 | 2.297 | 2.388 |
| (T1+G78)/(G12+T2+G23) | 3.072 | 3.487 | 3.527 |
| (T7+G78+T8)/(G45+G56+G67) | 5.548 | 4.382 | 3.797 |
| (G23+T3+G34)/T8 | 2.183 | 1.838 | 1.524 |
| (T3+G34+T4)/(G45+G56) | 2.999 | 2.070 | 1.848 |
| EFL/(G23+G34+T4) | 5.624 | 6.500 | 5.481 |
| AAG/(T1+G45) | 1.925 | 1.664 | 1.573 |
| V4+V5+V6 | 131.217 | 131.217 | 94.473 |
| ALT/(T2+T4+G45) | 5.629 | 5.693 | 5.365 |
| (T8+BFL)/G56 | 6.043 | 4.783 | 5.101 |
| TL/(T7+BFL) | 6.153 | 6.118 | 6.679 |
| T6/(G56+G67) | 3.525 | 2.637 | 2.613 |
| (T6+T8)/T2 | 4.053 | 4.153 | 5.083 |
| (T1+G12)/(T2+G23) | 1.630 | 1.950 | 2.004 |
| ImgH/(T2+G23+T3) | 4.755 | 5.132 | 5.348 |
| (T3+G34+T4)/G23 | 2.875 | 2.911 | 2.784 |

Figure 36

OPTICAL IMAGING LENS

CROSS-REFERENCE TO RELATED APPLICATION

This application claims the priority benefit of China application serial no. 202111626385.9, filed on Dec. 28, 2021. The entirety of the above-mentioned patent application is hereby incorporated by reference herein and made a part of this specification.

BACKGROUND OF THE INVENTION

Technical Field

The disclosure relates to an optical device, and in particular, to an optical imaging lens.

Description of Related Art

In recent years, optical imaging lenses keep evolving. In addition to making optical imaging lenses light, thin, and compact, improving the imaging quality of such lenses, such as improving the lens aberration and chromatic aberration, is also important. To cope with the demands, the number of optical lens elements may be increased, but such increase would result in a longer distance between the object-side surface of the first lens element and the image plane on the optical axis, which makes it difficult to reduce the thickness of mobile phones and digital cameras. Therefore, efforts have been devoted to provide an optical imaging lens which is light, thin, and compact and has favorable imaging quality. In addition, a small F-number increases the luminous flux, and a great image height helps moderately increase the pixel size which is conducive to night shooting. Thus, a small F-number and a great image height are gradually becoming the trend on the market. Therefore, how to design an optical imaging lens exhibiting a great image height and a small F-number in addition to being light, thin, and compact has been a research and development focus as well.

SUMMARY

The disclosure provides an optical imaging lens capable of correcting an edge aberration, exhibiting a great image height, improving a spherical aberration and aberration of the optical imaging lens, reducing distortion, alleviating a chromatic aberration, and reducing flare.

The disclosure provides an optical imaging lens, including a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The third lens element has positive refracting power, and a periphery region of the object-side surface of the third lens element is concave. An optical axis region of the image-side surface of the fifth lens element is concave, and a periphery region of the image-side surface of the fifth lens element is convex. An optical axis region of the object-side surface of the sixth lens element is concave. The seventh lens element has negative refracting power. Lens elements of the optical imaging lens are only the eight lens elements and satisfy $(V2+V3+V4+V6)/V7 \leq 5.500$. V2 is an Abbe number of the second lens element, V3 is an Abbe number of the third lens element, V4 is an Abbe number of the fourth lens element, V6 is an Abbe number of the sixth lens element, and V7 is an Abbe number of the seventh lens element.

The disclosure further provides an optical imaging lens, including a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The third lens element has positive refracting power, and a periphery region of the object-side surface of the third lens element is concave. A periphery region of the image-side surface of the fourth lens element is convex. An optical axis region of the object-side surface of the fifth lens element is convex. An optical axis region of the object-side surface of the sixth lens element is concave. The seventh lens element has negative refracting power, and an optical axis region of the image-side surface of the seventh lens element is concave. Lens elements of the optical imaging lens are only the eight lens elements and satisfy $(V2+V3+V4+V6)/V7 \leq 5.500$. V2 is an Abbe number of the second lens element, V3 is an Abbe number of the third lens element, V4 is an Abbe number of the fourth lens element, V6 is an Abbe number of the sixth lens element, and V7 is an Abbe number of the seventh lens element.

The disclosure further provides an optical imaging lens, including a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The third lens element has positive refracting power, and a periphery region of the object-side surface of the third lens element is concave. An optical axis region of the image-side surface of the fifth lens element is concave. An optical axis region of the object-side surface of the sixth lens element is concave. The seventh lens element has negative refracting power, and an optical axis region of the image-side surface of the seventh lens element is concave. The second lens element has negative refracting power or the eighth lens element has negative refracting power. Lens elements of the optical imaging lens are only the eight lens elements and satisfy $(V2+V3+V4+V6)/V7 \leq 5.500$. V2 is an Abbe number of the second lens element, V3 is an Abbe number of the third lens element, V4 is an Abbe number of the fourth lens element, V6 is an Abbe number of the sixth lens element, and V7 is an Abbe number of the seventh lens element.

To sum up, the optical imaging lens provided the embodiments of the disclosure is advantageous because of the following: the edge aberration may be corrected through the design of the surface shape and the refracting power, for example. In addition, the spherical aberration and aberration of the optical imaging lens may be improved and distortion may be reduced while the optical imaging lens is designed to have a great image height. Through the arrangement of materials, the chromatic aberration may be alleviated, good optical quality may be obtained, and flare may be reduced.

In order to make the aforementioned and other features and advantages comprehensible, several exemplary embodiments accompanied with figures are described in detail below.

BRIEF DESCRIPTION OF THE DRAWINGS

FIG. 6 is a schematic diagram of an optical imaging lens of a first embodiment of the disclosure.

FIG. 7A to FIG. 7D are diagrams of longitudinal spherical aberrations and various aberrations of the optical imaging lens of the first embodiment.

FIG. 8 illustrates detailed optical data of the optical imaging lens of the first embodiment of the disclosure.

FIG. 9 illustrates aspheric surface parameters of the optical imaging lens of the first embodiment of the disclosure.

FIG. 10 is a schematic diagram of an optical imaging lens of a second embodiment of the disclosure.

FIG. 11A to FIG. 11D are diagrams of longitudinal spherical aberrations and various aberrations of the optical imaging lens of the second embodiment.

FIG. 12 illustrates detailed optical data of the optical imaging lens of the second embodiment of the disclosure.

FIG. 13 illustrates aspheric surface parameters of the optical imaging lens of the second embodiment of the disclosure.

FIG. 14 is a schematic diagram of an optical imaging lens of a third embodiment of the disclosure.

FIG. 15A to FIG. 15D are diagrams of longitudinal spherical aberrations and various aberrations of the optical imaging lens of the third embodiment.

FIG. 16 illustrates detailed optical data of the optical imaging lens of the third embodiment of the disclosure.

FIG. 17 illustrates aspheric surface parameters of the optical imaging lens of the third embodiment of the disclosure.

FIG. 18 is a schematic diagram of an optical imaging lens of a fourth embodiment of the disclosure.

FIG. 19A to FIG. 19D are diagrams of longitudinal spherical aberrations and various aberrations of the optical imaging lens of the fourth embodiment.

FIG. 20 illustrates detailed optical data of the optical imaging lens of the fourth embodiment of the disclosure.

FIG. 21 illustrates aspheric surface parameters of the optical imaging lens of the fourth embodiment of the disclosure.

FIG. 22 is a schematic diagram of an optical imaging lens of a fifth embodiment of the disclosure.

FIG. 23A to FIG. 23D are diagrams of longitudinal spherical aberrations and various aberrations of the optical imaging lens of the fifth embodiment.

FIG. 24 illustrates detailed optical data of the optical imaging lens of the fifth embodiment of the disclosure.

FIG. 25 illustrates aspheric surface parameters of the optical imaging lens of the fifth embodiment of the disclosure.

FIG. 26 is a schematic diagram of an optical imaging lens of a sixth embodiment of the disclosure.

FIG. 27A to FIG. 27D are diagrams of longitudinal spherical aberrations and various aberrations of the optical imaging lens of the sixth embodiment.

FIG. 28 illustrates detailed optical data of the optical imaging lens of the sixth embodiment of the disclosure.

FIG. 29 illustrates aspheric surface parameters of the optical imaging lens of the sixth embodiment of the disclosure.

FIG. 30 is a schematic diagram of an optical imaging lens of a seventh embodiment of the disclosure.

FIG. 31A to FIG. 31D are diagrams of longitudinal spherical aberrations and various aberrations of the optical imaging lens of the seventh embodiment.

FIG. 32 illustrates detailed optical data of the optical imaging lens of the seventh embodiment of the disclosure.

FIG. 33 illustrates aspheric surface parameters of the optical imaging lens of the seventh embodiment of the disclosure.

FIG. 34 illustrates numerical values of all important parameters of the optical imaging lenses of the first to the seventh embodiments of the disclosure.

FIG. 35 illustrates numerical values of relational expressions of all important parameters of the optical imaging lenses of the first to the fourth embodiments of the disclosure.

FIG. 36 illustrates numerical values of relational expressions of all important parameters of the optical imaging lenses of the fifth to the seventh embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
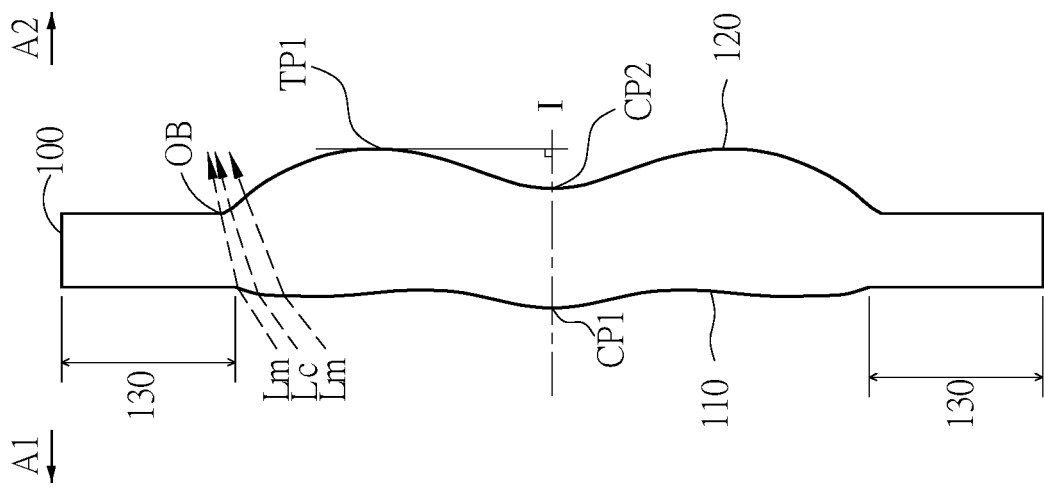
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
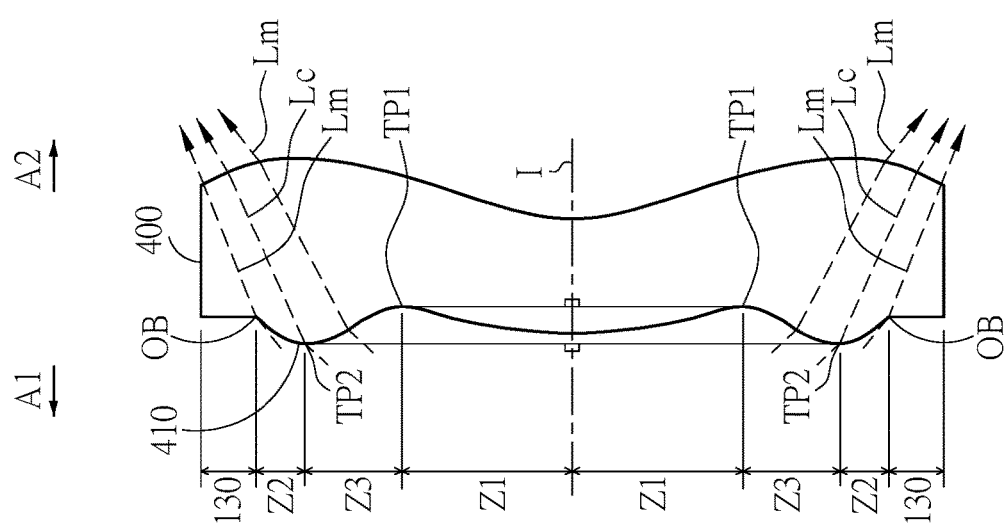
FIG. 4 is a schematic diagram illustrating a surface shape structure of a lens element of Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the $N^{th}$ transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
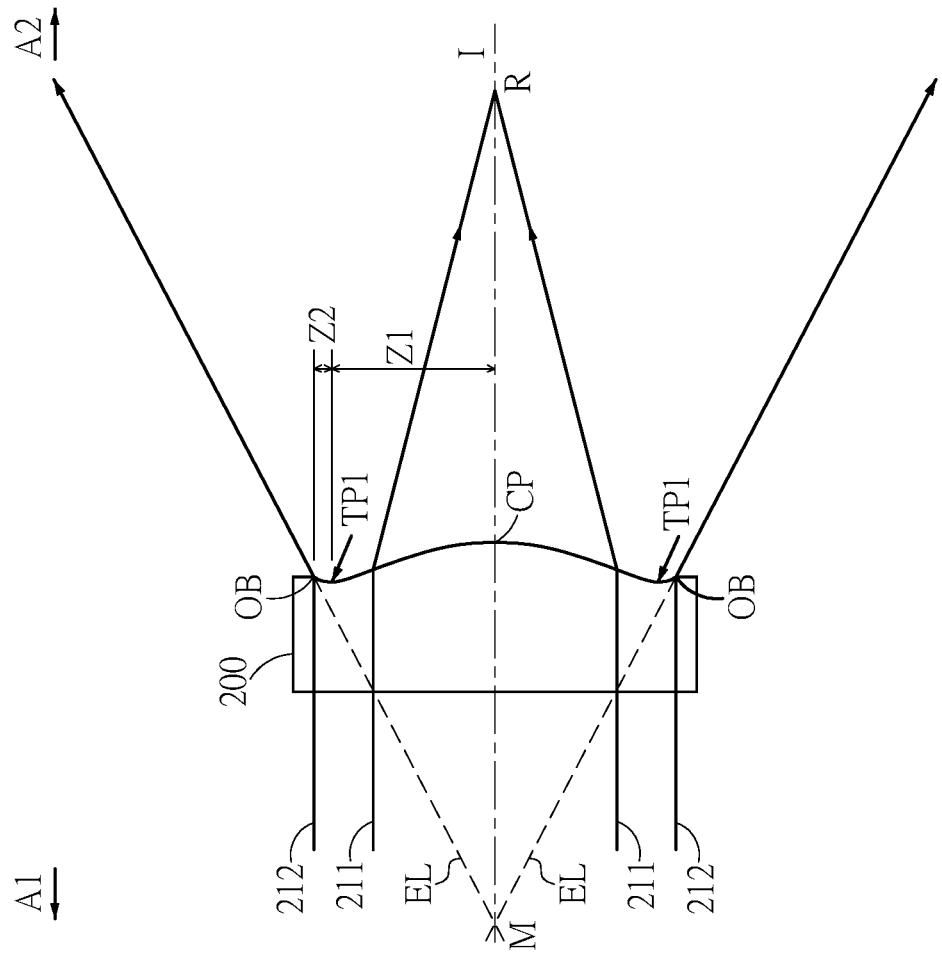
FIG. 2 is a schematic diagram illustrating a surface shape and concave-convex structure and an intersection point of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)", "a region is convex (concave)", and "a convex-(concave-) region" can be used alternatively.

Figure 5:
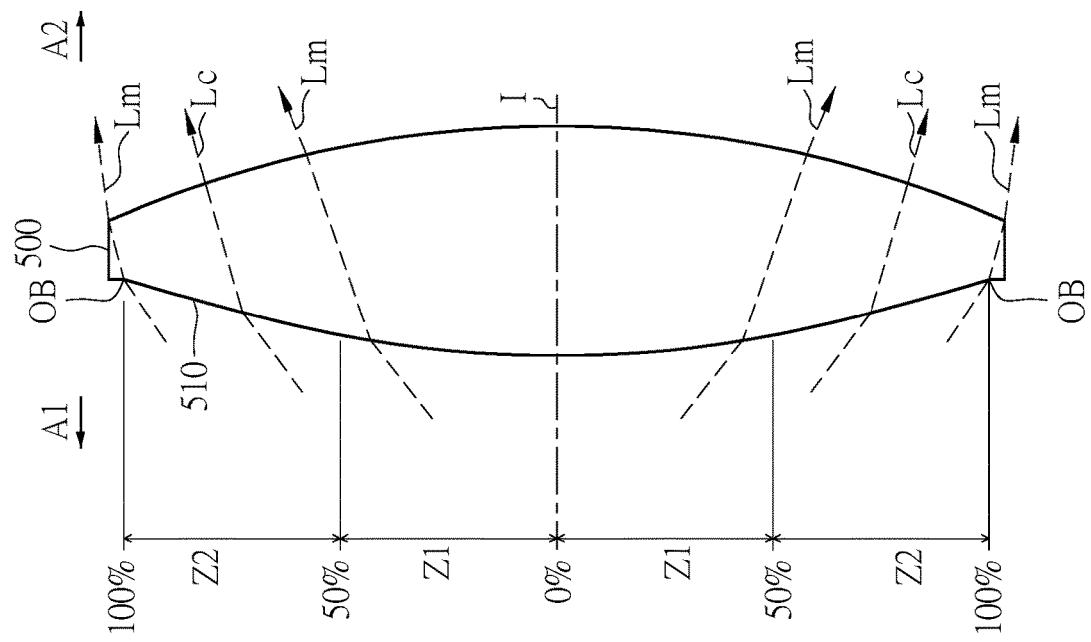
FIG. 5 is a schematic diagram illustrating a surface shape structure of a lens element of Example 3.
Figure 3:
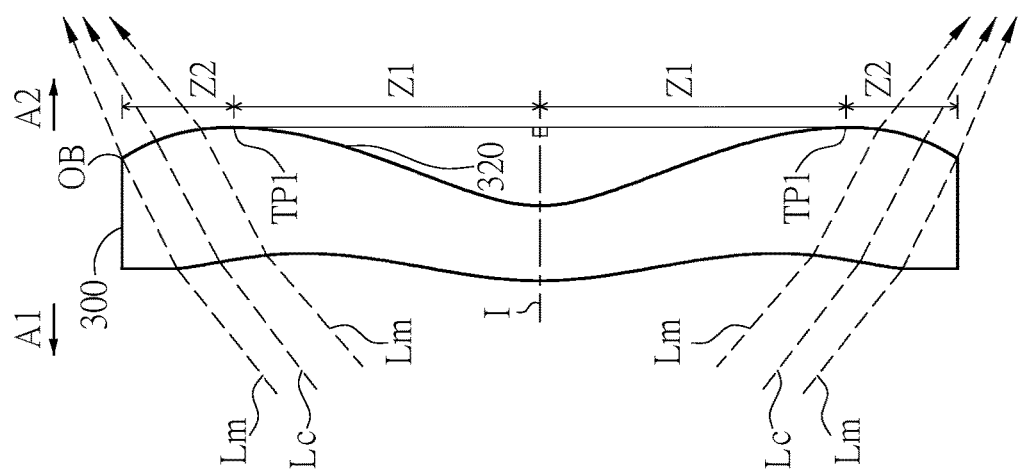
FIG. 3 is a schematic diagram illustrating a surface shape structure of a lens element of Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram of an optical imaging lens of a first embodiment of the disclosure. FIG. 7A to FIG. 7D are diagrams of longitudinal spherical aberrations and various aberrations of the optical imaging lens of the first embodiment. Referring to FIG. 6 first, an optical imaging lens 10 of the first embodiment of the disclosure includes an aperture 0, a first lens element 1, a second lens element 2, a third lens element 3, a fourth lens element 4, a fifth lens element 5, a sixth lens element 6, a seventh lens element 7, an eighth lens element 8, and a filter 9 sequentially arranged along an optical axis I of the optical imaging lens 10 from an object side A1 to an image side A2. After rays emitted by an object to be photographed enter the optical imaging lens 10 and pass through the aperture 0, the first lens element 1, the second lens element 2, the third lens element 3, the fourth lens element 4, the fifth lens element 5, the sixth lens element 6, the seventh lens element 7, the eighth lens element 8, and the filter 9, an image may formed on an image plane 99. The filter 9 is arranged between an image-side surface 86 of the eighth lens element 8 and the image plane 99. It is supplemented that the object side A1 is a side facing the object to be photographed, and the image side A2 is a side facing the image plane 99. In this embodiment, the filter 9 is an infrared ray (IR) cut filter.

In this embodiment, the first lens element 1, the second lens element 2, the third lens element 3, the fourth lens element 4, the fifth lens element 5, the sixth lens element 6, the seventh lens element 7, the eighth lens element 8, and the filter 9 of the optical imaging lens 10 each has an object-side surface 15, 25, 35, 45, 55, 65, 75, 85, 95 facing the object side A1 and allowing imaging rays to pass through, and an image-side surface 16, 26, 36, 46, 56, 66, 76, 86, 96 facing the image side A2 and allowing the imaging rays to pass through. In this embodiment, the first lens element 1 is arranged between the aperture 0 and the second lens element 2.

The first lens element 1 has positive refracting power. An optical axis region 151 of the object-side surface 15 of the first lens element 1 is convex, and a periphery region 153 thereof is convex. An optical axis region 161 of the image-side surface 16 of the first lens element 1 is concave, and a periphery region 163 thereof is concave. In this embodiment, both the object-side surface 15 and the image-side surface 16 of the first lens element 1 are aspheric surfaces, but the disclosure is not limited thereto. In addition, a material of the first lens element 1 is plastic.

The second lens element 2 has negative refracting power. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In this embodiment, both the object-side surface 25 and the image-side surface 26 of the second lens element 2 are aspheric surfaces, but the disclosure is not limited thereto. In addition, a material of the second lens element 2 is plastic.

The third lens element 3 has positive refracting power. An optical axis region 351 of the object-side surface 35 of the third lens element 3 is convex, and a periphery region 353 thereof is concave. An optical axis region 361 of the image-side surface 36 of the third lens element 3 is concave, and a periphery region 363 thereof is convex. In this embodiment, both the object-side surface 35 and the image-side surface 36 of the third lens element 3 are aspheric surfaces, but the disclosure is not limited thereto. In addition, a material of the third lens element 3 is plastic.

The fourth lens element 4 has negative refracting power. An optical axis region 451 of the object-side surface 45 of the fourth lens element 4 is convex, and a periphery region 453 thereof is concave. An optical axis region 461 of the image-side surface 46 of the fourth lens element 4 is concave, and a periphery region 463 thereof is convex. In this embodiment, both the object-side surface 45 and the image-side surface 46 of the fourth lens element 4 are aspheric surfaces, but the disclosure is not limited thereto. In addition, a material of the fourth lens element 4 is plastic.

The fifth lens element 5 has negative refracting power. An optical axis region 551 of the object-side surface 55 of the fifth lens element 5 is convex, and a periphery region 553 thereof is concave. An optical axis region 561 of the image-side surface 56 of the fifth lens element 5 is concave, and a periphery region 563 thereof is convex. In this embodiment, both the object-side surface 55 and the image-side surface 56 of the fifth lens element 5 are aspheric surfaces, but the disclosure is not limited thereto. In addition, a material of the fifth lens element 5 is plastic.

The sixth lens element 6 has positive refracting power. An optical axis region 651 of the object-side surface 65 of the sixth lens element 6 is concave, and a periphery region 653 thereof is concave. An optical axis region 661 of the image-side surface 66 of the sixth lens element 6 is convex, and a periphery region 663 thereof is concave. In this embodiment, both the object-side surface 65 and the image-side surface 66 of the sixth lens element 6 are aspheric surfaces, but the disclosure is not limited thereto. In addition, a material of the sixth lens element 6 is plastic.

The seventh lens element 7 has negative refracting power. An optical axis region 751 of the object-side surface 75 of the seventh lens element 7 is convex, and a periphery region 753 thereof is concave. An optical axis region 761 of the image-side surface 76 of the seventh lens element 7 is concave, and a periphery region 763 thereof is convex. In this embodiment, both the object-side surface 75 and the image-side surface 76 of the seventh lens element 7 are aspheric surfaces, but the disclosure is not limited thereto. In addition, a material of the seventh lens element 7 is plastic.

The eighth lens element 8 has negative refracting power. An optical axis region 851 of the object-side surface 85 of the eighth lens element 8 is concave, and a periphery region 853 thereof is convex. An optical axis region 861 of the image-side surface 86 of the eighth lens element 8 is concave, and a periphery region 863 thereof is convex. In this embodiment, both the object-side surface 85 and the image-side surface 86 of the eighth lens element 8 are aspheric surfaces, but the disclosure is not limited thereto. In addition, a material of the eighth lens element 8 is plastic.

In this embodiment, lens elements of the optical imaging lens 10 are only the eight lens elements described above.

Other detailed optical data of the first embodiment is as shown in FIG. 8, and the optical imaging lens 10 of the first embodiment has an effective focal length (EFL) of 6.525 millimeters (mm), a half field of view (HFOV) of 40.852 degrees, a system length of 8.972 mm, an F-number (Fno) of 1.500, and an image height of 6.200 mm. The system length is a distance between the object-side surface 15 of the first lens element 1 and the image plane 99 on the optical axis I.

In addition, in this embodiment, a total of sixteen surfaces, including the object-side surfaces 15, 25, 35, 45, 55, 65, 75, and 85 and the image-side surfaces 16, 26, 36, 46, 56, 66, 76, and 86 of the first lens element 1, the second lens element 2, the third lens element 3, the fourth lens element 4, the fifth lens element 5, the sixth lens element 6, the seventh lens element 7, and the eighth lens element 8, are all aspheric surfaces, and the object-side surfaces 15, 25, 35, 45, 55, 65, 75, and 85 and the image-side surfaces 16, 26, 36, 46, 56, 66, 76, and 86 are common even aspheric surfaces. These aspheric surfaces are defined according to the following formula (1):

$$Z(Y) = \frac{Y^2}{R}/(1 + \sqrt{1 - (1+K)\frac{Y^2}{R^2}}) + \sum_{i=1}^{n} a_i \times Y^i, \quad (1)$$

where:
R: a radius of curvature of a position, near the optical axis I, on a surface of the lens element,
Z: a depth of an aspheric surface (a perpendicular distance between a point, on the aspheric surface that is spaced by the distance Y from the optical axis I, and a tangent plane tangent to a vertex of the aspheric surface on the optical axis I),
Y: a perpendicular distance between a point on an aspheric curve and the optical axis I,
K: a conic constant, and
$a_i$: an $i^{th}$-order aspheric coefficient.

Various aspheric coefficients of the object-side surface 15 of the first lens element 1 to the image-side surface 86 of the eighth lens element 8 in Formula (1) are as shown in FIG. 9. Column number 15 in FIG. 9 denotes an aspheric coefficient of the object-side surface 15 of the first lens element 1, and the rest columns may be deduced by analogy. In this embodiment and the embodiments as follows, the second-order aspheric coefficient $a_2$ of each aspheric surface is zero, so they are not listed in FIG. 9.

In addition, relations among all important parameters in the optical imaging lens 10 of the first embodiment are as shown in FIG. 34.

f1 is a focal length of the first lens element 1,
f2 is a focal length of the second lens element 2,
f3 is a focal length of the third lens element 3,
f4 is a focal length of the fourth lens element 4,
f5 is a focal length of the fifth lens element 5,
f6 is a focal length of the sixth lens element 6,
f7 is a focal length of the seventh lens element 7,
f8 is a focal length of the eighth lens element 8,
n1 is a refractive index of the first lens element 1,
n2 is a refractive index of the second lens element 2,
n3 is a refractive index of the third lens element 3,
n4 is a refractive index of the fourth lens element 4,
n5 is a refractive index of the fifth lens element 5,
n6 is a refractive index of the sixth lens element 6,
n7 is a refractive index of the seventh lens element 7,
n8 is a refractive index of the eighth lens element 8,
V1 is an Abbe number of the first lens element 1, the Abbe number may also be referred to as a dispersion coefficient,
V2 is an Abbe number of the second lens element 2,
V3 is an Abbe number of the third lens element 3,
V4 is an Abbe number of the fourth lens element 4,
V5 is an Abbe number of the fifth lens element 5,
V6 is an Abbe number of the sixth lens element 6,
V7 is an Abbe number of the seventh lens element 7,
V8 is an Abbe number of the eighth lens element 8,
T1 is a thickness of the first lens element 1 on the optical axis I,
T2 is a thickness of the second lens element 2 on the optical axis I,
T3 is a thickness of the third lens element 3 on the optical axis I,
T4 is a thickness of the fourth lens element 4 on the optical axis I,
T5 is a thickness of the fifth lens element 5 on the optical axis I,
T6 is a thickness of the sixth lens element 6 on the optical axis I,
T7 is a thickness of the seventh lens element 7 on the optical axis I,
T8 is a thickness of the eighth lens element 8 on the optical axis I,
G12 is an air gap between the first lens element 1 and the second lens element 2 on the optical axis I,
G23 is an air gap between the second lens element 2 and the third lens element 3 on the optical axis I,
G34 is an air gap between the third lens element 3 and the fourth lens element 4 on the optical axis I,
G45 is an air gap between the fourth lens element 4 and the fifth lens element 5 on the optical axis I,
G56 is an air gap between the fifth lens element 5 and the sixth lens element 6 on the optical axis I,
G67 is an air gap between the sixth lens element 6 and the seventh lens element 7 on the optical axis I, G78 is an air gap between the seventh lens element 7 and the eighth lens element 8 on the optical axis I, G8F is an air gap between the eighth lens element 8 and the filter 9 on the optical axis I, TF is a thickness of the filter 9 on the optical axis I, GFP is an air gap between the filter 9 and the image plane 99 on the optical axis I, AAG is a sum of the seven air gaps of the first lens element 1 to the eighth lens element 8 on the optical axis I, ALT is a sum of the thicknesses of the eight lens elements from the first lens element 1 to the eighth lens element 8 on the optical axis I, EFL is an effective focal length of the optical imaging lens 10, BFL is a distance from the image-side surface 86 of the eighth lens element 8 to the image plane 99 on the optical axis I, TTL is a distance from the object-side surface 15 of the first lens element 1 to the image plane 99 on the optical axis I, TL is a distance from the object-side surface 15 of the first lens element 1 to the image-side surface 86 of the eighth lens element 8 on the optical axis I, HFOV is a half field of view of the optical imaging lens 10, ImgH is an image height of the optical imaging lens 10, and Fno is an F-number of the optical imaging lens 10.

Referring to FIG. 7A to FIG. 7D together, the diagram of FIG. 7A illustrates longitudinal spherical aberrations on the image plane 99 of the first embodiment at wavelengths of 470 nm, 555 nm, and 650 nm. The diagrams of FIG. 7B and FIG. 7C respectively illustrate a field curvature aberration in a sagittal direction and a field curvature aberration in a tangential direction on the image plane 99 of the first embodiment at wavelengths of 470 nm, 555 nm, and 650 nm. The diagram of FIG. 7D illustrates a distortion aberration on the image plane 99 of the first embodiment at wavelengths of 470 nm, 555 nm, and 650 nm. The longitudinal spherical aberration of the first embodiment is as shown in FIG. 7A. A curve generated by each wavelength is close and is close to the center, which indicates that off-axis rays at different heights of each wavelength are concentrated near to an imaging point. It can be seen from the deflection amplitude of the curve of each wavelength that deflections of the imaging points of the off-axis rays at different heights are controlled within a range of ±0.12 mm, so that the first embodiment alleviates the spherical aberration of the same wavelength. In addition, distances between three representative wavelengths are close, it indicates that imaging positions of different wavelength rays are concentrated, so that a chromatic aberration is also alleviated.

In the two field curvature aberration diagrams of FIG. 7B and FIG. 7C, the focal length variables of three representative wavelengths within an entire field of view range fall within ±0.16 mm, it indicates that an optical system of the first embodiment can effectively eliminate the aberration. The distortion aberration diagram of FIG. 7D shows that the distortion aberration of this embodiment is maintained within a range of ±12%, it indicates that the distortion aberration of the first embodiment has met an imaging quality requirement of the optical system. It is indicated accordingly that compared with an existing optical lens, the first embodiment can still provide good imaging quality in the circumstances that the system length has been reduced to 8.972 mm, so the first embodiment has greater image height and good imaging quality under the condition of maintaining good optical properties.

FIG. 10 is a schematic diagram of an optical imaging lens of a second embodiment of the disclosure. FIG. 11A to FIG. 11D are diagrams of longitudinal spherical aberrations and various aberrations of the optical imaging lens of the second embodiment. Referring to FIG. 10 first, the second embodiment of the optical imaging lens 10 of the disclosure is approximately similar to the first embodiment, except that: various optical data, aspheric coefficients, and parameters among these lens elements 1, 2, 3, 4, 5, 6, 7, and 8 are different more or less. In addition, in this embodiment, the optical axis region 451 of the object-side surface 45 of the fourth lens element 4 is concave, the periphery region 553 of the object-side surface 55 of the fifth lens element 5 is convex, the periphery region 663 of the image-side surface 66 of the sixth lens element 6 is convex, and the periphery region 853 of the object-side surface 85 of the eighth lens element 8 is concave. It should be noted that in order to show the drawing clearly, reference numerals of the optical axis regions and the periphery regions which are similar to the surface shapes in the first embodiment are partially omitted in FIG. 10.

Detailed optical data of the optical imaging lens 10 of the second embodiment are as shown in FIG. 12, and the optical imaging lens 10 of the second embodiment has an EFL of 6.673 mm, an HFOV of 40.870 degrees, a system length of 9.000 mm, an Fno of 1.500, and an image height of 6.200 mm.

As shown in FIG. 13, FIG. 13 illustrates various aspheric coefficients of the object-side surface 15 of the first lens element 1 to the image-side surface 86 of the eighth lens element 8 of the second embodiment in formula (1).

In addition, relations among all important parameters in the optical imaging lens 10 of the second embodiment are as shown in FIG. 34.

A longitudinal spherical aberration of the second embodiment is as shown in FIG. 11A, and deflections of imaging points of off-axis rays at different heights are controlled within a range of ±0.06 mm. In the two field curvature aberration diagrams of FIG. 11B and FIG. 11C, focal length variables of three representative wavelengths within an entire field of view range fall within ±0.08 mm. The distortion aberration diagram of FIG. 11D shows that the distortion aberration of this embodiment is maintained within a range of ±6%.

It can be known from the above that: the HFOV of the second embodiment is greater than the HFOV of the first embodiment. Therefore, compared to the first embodiment, the second embodiment has a larger angle range for receiving images. In addition, the longitudinal spherical aberration of the second embodiment is less than the longitudinal spherical aberration of the first embodiment, the field curvature aberration of the second embodiment is less than the field curvature aberration of the first embodiment, and the distortion aberration of the second embodiment is less than the distortion aberration of the first embodiment.

FIG. 14 is a schematic diagram of an optical imaging lens of a third embodiment of the disclosure. FIG. 15A to FIG. 15D are diagrams of longitudinal spherical aberrations and various aberrations of the optical imaging lens of the third embodiment. Referring to FIG. 14 first, the third embodiment of the optical imaging lens 10 of the disclosure is approximately similar to the first embodiment, except that: various optical data, aspheric coefficients, and parameters among these lens elements 1, 2, 3, 4, 5, 6, 7, and 8 are different more or less. In addition, in this embodiment, the optical axis region 451 of the object-side surface 45 of the fourth lens element 4 is concave, and the fifth lens element 5 has positive refracting power. It should be noted that in order to show the drawing clearly, reference numerals of the optical axis regions and the periphery regions which are similar to the surface shapes in the first embodiment are partially omitted in FIG. 14.

Detailed optical data of the optical imaging lens 10 of the third embodiment are as shown in FIG. 16, and the optical imaging lens 10 of the third embodiment has an EFL of 6.828 mm, an HFOV of 40.862 degrees, a system length of 8.998 mm, an Fno of 1.500, and an image height of 6.200 mm.

As shown in FIG. 17, FIG. 17 illustrates various aspheric coefficients of the object-side surface 15 of the first lens element 1 to the image-side surface 86 of the eighth lens element 8 of the third embodiment in formula (1).

In addition, relations among all important parameters in the optical imaging lens 10 of the third embodiment are as shown in FIG. 34.

A longitudinal spherical aberration of the third embodiment is as shown in FIG. 15A, and deflections of imaging points of off-axis rays at different heights are controlled within a range of ±0.02 mm. In the two field curvature aberration diagrams of FIG. 15B and FIG. 15C, focal length variables of three representative wavelengths within an entire field of view range fall within ±0.1 mm. The distortion aberration diagram of FIG. 15D shows that the distortion aberration of this embodiment is maintained within a range of ±5%.

It can be known from the above that: the HFOV of the third embodiment is greater than the HFOV of the first embodiment. Therefore, compared to the first embodiment, the third embodiment has a larger angle range for receiving images. In addition, the longitudinal spherical aberration of the third embodiment is less than the longitudinal spherical aberration of the first embodiment, the field curvature aberration of the third embodiment is less than the field curvature aberration of the first embodiment, and the distortion aberration of the third embodiment is less than the distortion aberration of the first embodiment.

FIG. 18 is a schematic diagram of an optical imaging lens of a fourth embodiment of the disclosure. FIG. 19A to FIG. 19D are diagrams of longitudinal spherical aberrations and various aberrations of the optical imaging lens of the fourth embodiment. Referring to FIG. 18 first, the fourth embodiment of the optical imaging lens 10 of the disclosure is approximately similar to the first embodiment, except that: various optical data, aspheric coefficients, and parameters among these lens elements 1, 2, 3, 4, 5, 6, 7, and 8 are different more or less. In addition, in this embodiment, the optical axis region 361 of the image-side surface 36 of the third lens element 3 is convex, the periphery region 663 of the image-side surface 66 of the sixth lens element 6 is convex, and the periphery region 853 of the object-side surface 85 of the eighth lens element 8 is concave. It should be noted that in order to show the drawing clearly, reference numerals of the optical axis regions and the periphery regions which are similar to the surface shapes in the first embodiment are partially omitted in FIG. 18.

Detailed optical data of the optical imaging lens 10 of the fourth embodiment are as shown in FIG. 20, and the optical imaging lens 10 of the fourth embodiment has an EFL of 6.755 mm, an HFOV of 40.876 degrees, a system length of 9.025 mm, an Fno of 1.500, and an image height of 6.200 mm.

As shown in FIG. 21, FIG. 21 illustrates various aspheric coefficients of the object-side surface 15 of the first lens element 1 to the image-side surface 86 of the eighth lens element 8 of the fourth embodiment in formula (1).

In addition, relations among all important parameters in the optical imaging lens 10 of the fourth embodiment are as shown in FIG. 34.

A longitudinal spherical aberration of the fourth embodiment is as shown in FIG. 19A, and deflections of imaging points of off-axis rays at different heights are controlled within a range of ±0.1 mm. In the two field curvature aberration diagrams of FIG. 19B and FIG. 19C, focal length variables of three representative wavelengths within an entire field of view range fall within ±0.1 mm. The distortion aberration diagram of FIG. 19D shows that the distortion aberration of this embodiment is maintained within a range of ±4%.

It can be known from the above that: the HFOV of the fourth embodiment is greater than the HFOV of the first embodiment. Therefore, compared to the first embodiment, the fourth embodiment has a larger angle range for receiving images. In addition, the longitudinal spherical aberration of the fourth embodiment is less than the longitudinal spherical aberration of the first embodiment, the field curvature aberration of the fourth embodiment is less than the field curvature aberration of the first embodiment, and the distortion aberration of the fourth embodiment is less than the distortion aberration of the first embodiment.

FIG. 22 is a schematic diagram of an optical imaging lens of a fifth embodiment of the disclosure. FIG. 23A to FIG. 23D are diagrams of longitudinal spherical aberrations and various aberrations of the optical imaging lens of the fifth embodiment. Referring to FIG. 22 first, the fifth embodiment of the optical imaging lens 10 of the disclosure is approximately similar to the first embodiment, except that: various optical data, aspheric coefficients, and parameters among these lens elements 1, 2, 3, 4, 5, 6, 7, and 8 are different more or less. In addition, in this embodiment, the periphery region 663 of the image-side surface 66 of the sixth lens element 6 is convex. It should be noted that in order to show the drawing clearly, reference numerals of the optical axis regions and the periphery regions which are similar to the surface shapes in the first embodiment are partially omitted in FIG. 22.

Detailed optical data of the optical imaging lens 10 of the fifth embodiment are as shown in FIG. 24, and the optical imaging lens 10 of the fifth embodiment has an EFL of 6.917 mm, an HFOV of 40.855 degrees, a system length of 9.017 mm, an Fno of 1.500, and an image height of 6.200 mm.

As shown in FIG. 25, FIG. 25 illustrates various aspheric coefficients of the object-side surface 15 of the first lens element 1 to the image-side surface 86 of the eighth lens element 8 of the fifth embodiment in formula (1).

In addition, relations among all important parameters in the optical imaging lens 10 of the fifth embodiment are as shown in FIG. 34.

A longitudinal spherical aberration of the fifth embodiment is as shown in FIG. 23A, and deflections of imaging points of off-axis rays at different heights are controlled within a range of ±0.025 mm. In the two field curvature aberration diagrams of FIG. 23B and FIG. 23C, focal length variables of three representative wavelengths within an entire field of view range fall within ±0.16 mm. The distortion aberration diagram of FIG. 23D shows that the distortion aberration of this embodiment is maintained within a range of ±4%.

It can be known from the above that: the HFOV of the fifth embodiment is greater than the HFOV of the first embodiment. Therefore, compared to the first embodiment, the fifth embodiment has a larger angle range for receiving images. In addition, the longitudinal spherical aberration of the fifth embodiment is less than the longitudinal spherical aberration of the first embodiment, the field curvature aberration of the fifth embodiment is less than the field curvature aberration of the first embodiment, and the distortion aberration of the fifth embodiment is less than the distortion aberration of the first embodiment.

FIG. 26 is a schematic diagram of an optical imaging lens of a sixth embodiment of the disclosure. FIG. 27A to FIG. 27D are diagrams of longitudinal spherical aberrations and various aberrations of the optical imaging lens of the sixth embodiment. Referring to FIG. 26 first, the sixth embodiment of the optical imaging lens 10 of the disclosure is approximately similar to the first embodiment, except that: various optical data, aspheric coefficients, and parameters among these lens elements 1, 2, 3, 4, 5, 6, 7, and 8 are different more or less. In addition, in this embodiment, the periphery region 663 of the image-side surface 66 of the sixth lens element 6 is convex. It should be noted that in order to show the drawing clearly, reference numerals of the optical axis regions and the periphery regions which are similar to the surface shapes in the first embodiment are partially omitted in FIG. 26.

Detailed optical data of the optical imaging lens 10 of the sixth embodiment are as shown in FIG. 28, and the optical imaging lens 10 of the sixth embodiment has an EFL of 7.026 mm, an HFOV of 40.859 degrees, a system length of 8.992 mm, an Fno of 1.500, and an image height of 6.200 mm.

As shown in FIG. 29, FIG. 29 illustrates various aspheric coefficients of the object-side surface 15 of the first lens element 1 to the image-side surface 86 of the eighth lens element 8 of the sixth embodiment in formula (1).

In addition, relations among all important parameters in the optical imaging lens 10 of the sixth embodiment are as shown in FIG. 34.

A longitudinal spherical aberration of the sixth embodiment is as shown in FIG. 27A, and deflections of imaging points of off-axis rays at different heights are controlled within a range of ±0.035 mm. In the two field curvature aberration diagrams of FIG. 27B and FIG. 27C, focal length variables of three representative wavelengths within an entire field of view range fall within ±0.1 mm. The distortion aberration diagram of FIG. 27D shows that the distortion aberration of this embodiment is maintained within a range of ±3%.

It can be known from the above that: the HFOV of the sixth embodiment is greater than the HFOV of the first embodiment. Therefore, compared to the first embodiment, the sixth embodiment has a larger angle range for receiving images. In addition, the longitudinal spherical aberration of the sixth embodiment is less than the longitudinal spherical aberration of the first embodiment, the field curvature aberration of the sixth embodiment is less than the field curvature aberration of the first embodiment, and the distortion aberration of the sixth embodiment is less than the distortion aberration of the first embodiment.

FIG. 30 is a schematic diagram of an optical imaging lens of a seventh embodiment of the disclosure. FIG. 31A to FIG. 31D are diagrams of longitudinal spherical aberrations and various aberrations of the optical imaging lens of the seventh embodiment. Referring to FIG. 30 first, the seventh embodiment of the optical imaging lens 10 of the disclosure is approximately similar to the first embodiment, except that: various optical data, aspheric coefficients, and parameters among these lens elements 1, 2, 3, 4, 5, 6, 7, and 8 are different more or less. In addition, in this embodiment, the fourth lens element 4 has positive refracting power, and the periphery region 853 of the object-side surface 85 of the eighth lens element 8 is concave. It should be noted that in order to show the drawing clearly, reference numerals of the optical axis regions and the periphery regions which are similar to the surface shapes in the first embodiment are partially omitted in FIG. 30.

Detailed optical data of the optical imaging lens 10 of the seventh embodiment are as shown in FIG. 32, and the optical imaging lens 10 of the seventh embodiment has an EFL of 6.162 mm, an HFOV of 41.147 degrees, a system length of 8.997 mm, an Fno of 1.500, and an image height of 6.200 mm.

As shown in FIG. 33, FIG. 33 illustrates various aspheric coefficients of the object-side surface 15 of the first lens element 1 to the image-side surface 86 of the eighth lens element 8 of the seventh embodiment in formula (1).

In addition, relations among all important parameters in the optical imaging lens 10 of the seventh embodiment are as shown in FIG. 34.

A longitudinal spherical aberration of the seventh embodiment is as shown in FIG. 31A, and deflections of imaging points of off-axis rays at different heights are controlled within a range of ±0.25 mm. In the two field curvature aberration diagrams of FIG. 31B and FIG. 31C, focal length variables of three representative wavelengths within an entire field of view range fall within ±0.25 mm. The distortion aberration diagram of FIG. 31D shows that the distortion aberration of this embodiment is maintained within a range of ±14%.

It can be known from the above that: the HFOV of the seventh embodiment is greater than the HFOV of the first embodiment. Therefore, compared to the first embodiment, the seventh embodiment has a larger angle range for receiving images.

Referring to FIG. 35 to FIG. 36 together, FIG. 35 illustrates a tabular diagram of various optical parameters of the foregoing first embodiment to the fourth embodiment, and FIG. 35 illustrates a tabular diagram of various optical parameters of the foregoing fifth embodiment to the seventh embodiment. Through the optical imaging lens 10 of the foregoing embodiments, it can be known that the optical imaging lens 10 of the disclosure can correct an edge aberration via the design of the surface shape and the refracting power, for example, the third lens element 3 is designed to have positive refracting power, and the periphery region 351 of the object-side surface 35 of the third lens element 3 is designed to be concave. In addition, if the optical axis region 561 of the image-side surface 56 of the fifth lens element 5 is also designed to be concave, the periphery region 563 of the image-side surface 56 of the fifth lens element 5 is convex, the optical axis region 651 of the object-side surface 65 of the sixth lens element 6 is concave, and the seventh lens element 7 has negative refracting power, the spherical aberration and aberration of the optical imaging lens 10 may be improved and distortion may be reduced while the optical imaging lens 10 is designed to have a great image height. When the optical imaging lens 10 satisfies $(V2+V3+V4+V6)/V7 \leq 5.500$ through the arrangement of materials, the chromatic aberration may be alleviated, good optical quality may be obtained, and the curvature of the image-side surface 16 of the first lens element 1 may be lowered to reduce flare. The preferable range is $1.300 \leq (V2+V3+V4+V6)/V7 \leq 5.500$. Herein, if it is further satisfied that the first lens element 1 has positive refracting power, or the second lens element 2 has negative refracting power, or the sixth lens element 6 has positive refracting power, or the eighth lens element 8 has negative refracting power, the production yield of the optical imaging lens 10 may be improved.

Besides, the optical imaging lens 10 of the disclosure can correct the edge aberration via the design of the surface shape and the refracting power, for example, the third lens element 3 is designed to have positive refracting power, and the periphery region 351 of the object-side surface 35 of the third lens element 3 is designed to be concave. In addition, if the periphery region 463 of the image-side surface 46 of the fourth lens element 4 is designed to be convex, the optical axis region 551 of the object-side surface 55 of the fifth lens element 5 is convex, the optical axis region 651 of the object-side surface 65 of the sixth lens element 6 is concave, the seventh lens element 7 has negative refracting power, and the optical axis region 761 of the image-side surface 76 of the seventh lens element 7 is concave, the F-number may be reduced, aberrations may be improved, and distortion may be decreased while the optical imaging lens 10 is designed to have a great image height. When $(V2+V3+V4+V6)/V7 \leq 5.500$ is satisfied through the arrangement of materials, the chromatic aberration may be alleviated, good optical quality may be obtained, and the curvature of the image-side surface 16 of the first lens element 1 may be lowered to reduce flare. The preferable range is $1.300 \leq (V2+V3+V4+V6)/V7 \leq 5.500$. Herein, if it is further satisfied that the first lens element 1 has positive refracting power, or the second lens element 2 has negative refracting power, or the sixth lens element 6 has positive refracting power, or the eighth lens element 8 has negative refracting power, the production yield of the optical imaging lens 10 may be improved.

Besides, the optical imaging lens 10 of the disclosure can correct the edge aberration via the design of the surface shape and the refracting power, for example, the third lens element 3 is designed to have positive refracting power, and the periphery region 351 of the object-side surface 35 of the third lens element 3 is designed to be concave. In addition, if the optical axis region 561 of the object-side surface 56 of the fifth lens element 5 is also designed to be concave, the optical axis region 651 of the object-side surface 65 of the sixth lens element 6 is concave, the seventh lens element 7 has negative refracting power, and the optical axis region 761 of the image-side surface 76 of the seventh lens element 7 is concave, the F-number may be reduced, aberrations may be improved, and distortion may be decreased while the optical imaging lens 10 is designed to have a great image height. In addition, if the second lens element 2 is also designed to have negative refracting power or the eighth lens element 8 has negative refracting power, a ray path may be corrected and system sensitivity may be lowered. When $(V2+V3+V4+V6)/V7 \leq 5.500$ is satisfied through the arrangement of materials, the chromatic aberration may be alleviated, good optical quality may be obtained, and the curvature of the image-side surface 16 of the first lens element 1 may be lowered to reduce flare. The preferable range is $1.300 \leq (V2+V3+V4+V6)/V7 \leq 5.500$. Herein, if it is further satisfied that the first lens element 1 has positive refracting power or the sixth lens element 6 has positive refracting power, the production yield of the optical imaging lens 10 may be improved.

In addition, when the optical imaging lens 10 provided by the disclosure satisfies one of the following combinations (a) to (f), system sensitivity may be lowered:
(a) at least one of the fifth lens element 5, the sixth lens element 6, and the seventh lens element 7 has positive refracting power,
(b) at least one of the fourth lens element 4, the fifth lens element 5, and the sixth lens element 6 has positive refracting power,
(c) at least one of the fifth lens element 5 and the sixth lens element 6 has positive refracting power,
(d) at least one of the fourth lens element 4 and the eighth lens element 8 has negative refracting power,
(e) the fifth lens element 5 has negative refracting power or the sixth lens element 6 has positive refracting power, and
(f) the fourth lens element 4 has negative refracting power or the eighth lens element 8 has negative refracting power.

In addition, in the optical imaging lens 10 provided by the disclosure, through the material design of $(V2+V3+V4+V8)/V7 \leq 5.500$ or $V4+V5+V6 \geq 90.000$, the sensitivity of the modulation transfer function (MTF) may be reduced and the chromatic aberration may be alleviated, and the preferable range is $2.000 \leq (V2+V3+V4+V8)/V7 \leq 5.500$ and $90.000 \leq V4+V5+V6 \leq 135.000$.

In addition, if satisfying $ImgH/(T2+G23+T3) \geq 4.200$, the optical imaging lens 10 provided by the disclosure may have a great image height and reduced system length, and the preferable range is $4.200 \leq ImgH/(T2+G23+T3) \leq 5.500$.

In addition, in order to reduce the system length of the optical imaging lens 10, the air gaps between the lens elements or the thicknesses of the lens elements may be appropriately adjusted, but the complexity of fabrication must be considered and the imaging quality needs to be guaranteed, so that better configurations may be achieved if numerical limits of the following conditions are satisfied.

The optical imaging lens 10 may satisfy $(G45+T5+G56)/(G12+T3) \geq 2.000$, and the preferable range may be $2.000 \leq (G45+T5+G56)/(G12+T3) \leq 3.100$, the optical imaging lens 10 may satisfy $(T5+T6)/(T2+T4) \geq 1.500$, and the preferable range may be $1.500 \leq (T5+T6)/(T2+T4) \leq 2.500$, the optical imaging lens 10 may satisfy $(T1+G78)/(G12+T2+G23) \geq 2.500$, and the preferable range may be $2.500 \leq (T1+G78)/(G12+T2+G23) \leq 3.600$, the optical imaging lens 10 may satisfy $(T7+G78+T8)/(G45+G56+G67) \geq 3.700$, and the preferable range may be $3.700 \leq (T7+G78+T8)/(G45+G56+G67) \leq 5.600$, the optical imaging lens 10 may satisfy $(G23+T3+G34)/T8 \leq 2.800$, and the preferable range may be $1.500 \leq (G23+T3+G34)/T8 \leq 2.800$, the optical imaging lens 10 may satisfy $(T3+G34+T4)/(G45+G56) \leq 3.000$, and the preferable range may be $1.500 \leq (T3+G34+T4)/(G45+G56) \leq 3.000$, the optical imaging lens 10 may satisfy $EFL/(G23+G34+T4) \leq 6.500$, and the preferable range may be $4.500 \leq EFL/(G23+G34+T4) \leq 6.500$, the optical imaging lens 10 may satisfy $AAG/(T1+G45) \leq 2.500$, and the preferable range may be $1.500 \leq AAG/(T1+G45) \leq 2.500$, the optical imaging lens 10 may satisfy $ALT/(T2+T4+G45) \geq 4.600$, and the preferable range may be $4.600 \leq ALT/(T2+T4+G45) \leq 5.800$, the optical imaging lens 10 may satisfy $(T8+BFL)/G56 \geq 3.900$, and the preferable range may be $3.900 \leq (T8+BFL)/G56 \leq 6.100$, the optical imaging lens 10 may satisfy TL/(T7+BFL) ≥4.900, and the preferable range may be 4.900≤TL/(T7+BFL)≤6.700, the optical imaging lens 10 may satisfy T6/(G56+G67) ≥1.900, and the preferable range may be 1.900≤T6/(G56+G67)≤3.600, the optical imaging lens 10 may satisfy (T6+T8)/T2≥3.900, and the preferable range may be 3.900≤(16+18)/T2≤5.100, the optical imaging lens 10 may satisfy (T1+G12)/(T2+G23)≥1.100, and the preferable range may be 1.100≤(T1+G12)/(T2+G23)≤2.100, and the optical imaging lens 10 may satisfy (T3+G34+T4)/G23≤3.500, and the preferable range may be 1.900≤(T3+G34+T4)/G23≤3.500.

In addition, any combination relationships of the parameters of the embodiments may be additionally selected to add limits to the optical imaging lens, so as to facilitate the optical imaging lens design of the same architecture of the disclosure.

In view of the unpredictability of the optical system design, under the architecture of the disclosure, the optical imaging lens, satisfying the foregoing conditional expressions, of the disclosure may have a reduced system length, an increased aperture, improved imaging quality, or increased assembling yield over the prior art.

The above-listed exemplary limitation relational expressions can also be arbitrarily selectively incorporated in unequal numbers to be applied to the embodiments of the disclosure, and they are not limited thereto. During the implementation of the disclosure, in addition to the aforementioned relational expressions, detailed structures, such as the arrangement of concave and convex surfaces, for a single lens element or broadly for a plurality of lens elements to enhance the system performance and/or control of the resolution. It should be noted that these details need to be selectively incorporated in other embodiments of the disclosure without conflicts.

An aspheric design is adopted for the lens elements in all the embodiments of the disclosure, thereby rendering favorable imaging quality.

Plastic materials are selected for the lens elements in the respective embodiments of the disclosure, such that the weight of the optical imaging lens as well as the costs thereof are reduced.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through, the third lens element has positive refracting power, and a periphery region of the object-side surface of the third lens element is concave, an optical axis region of the image-side surface of the fifth lens element is concave, and a periphery region of the image-side surface of the fifth lens element is convex, an optical axis region of the object-side surface of the sixth lens element is concave, the seventh lens element has negative refracting power, and the eighth lens element has negative refracting power, wherein lens elements of the optical imaging lens are only the eight lens elements and satisfy a conditional expression as follows:

(V2+V3+V4+V6)/V7≤5.500, wherein V2 is an Abbe number of the second lens element, V3 is an Abbe number of the third lens element; V4 is an Abbe number of the fourth lens element, V6 is an Abbe number of the sixth lens element, and V7 is an Abbe number of the seventh lens element.

2. The optical imaging lens according to claim 1, wherein the optical imaging lens further satisfies a conditional expression as follows: (G45+T5+G56)/(G12+T3)≥2.100, wherein G45 is an air gap between the fourth lens element and the fifth lens element on the optical axis, T5 is a thickness of the fifth lens element on the optical axis, G56 is an air gap between the fifth lens element and the sixth lens element on the optical axis, G12 is an air gap between the first lens element and the second lens element on the optical axis, and T3 is a thickness of the third lens element on the optical axis.

3. The optical imaging lens according to claim 1, wherein the optical imaging lens further satisfies a conditional expression as follows: (T5+T6)/(T2+T4)≥1.500, wherein T5 is a thickness of the fifth lens element on the optical axis, T6 is a thickness of the sixth lens element on the optical axis, T2 is a thickness of the second lens element on the optical axis, and T4 is a thickness of the fourth lens element on the optical axis.

4. The optical imaging lens according to claim 1, wherein the optical imaging lens further satisfies a conditional expression as follows: (T1+G78)/(G12+T2+G23)≥2.500, wherein T1 is a thickness of the first lens element on the optical axis, G78 is an air gap between the seventh lens element and the eighth lens element on the optical axis, G12 is an air gap between the first lens element and the second lens element on the optical axis, T2 is a thickness of the second lens element on the optical axis, and G23 is an air gap between the second lens element and the third lens element on the optical axis.

5. The optical imaging lens according to claim 1, wherein the optical imaging lens further satisfies a conditional expression as follows: (T7+G78+T8)/(G45+G56+G67) ≥3.700, wherein T7 is a thickness of the seventh lens element on the optical axis, G78 is an air gap between the seventh lens element and the eighth lens element on the optical axis, T8 is a thickness of the eighth lens element on the optical axis, G45 is an air gap between the fourth lens element and the fifth lens element on the optical axis, G56 is an air gap between the fifth lens element and the sixth lens element on the optical axis, and G67 is an air gap between the sixth lens element and the seventh lens element on the optical axis.

6. The optical imaging lens according to claim 1, wherein the optical imaging lens further satisfies a conditional expression as follows: (G23+T3+G34)/T8≤2.800, wherein G23 is an air gap between the second lens element and the third lens element on the optical axis, T3 is a thickness of the third lens element on the optical axis, G34 is an air gap between the third lens element and the fourth lens element on the optical axis, and T8 is a thickness of the eighth lens element on the optical axis.

7. The optical imaging lens according to claim 1, wherein the optical imaging lens further satisfies a conditional expression as follows: (T3+G34+T4)/(G45+G56)≤3.000, wherein T3 is a thickness of the third lens element on the optical axis, G34 is an air gap between the third lens element and the fourth lens element on the optical axis, T4 is a thickness of the fourth lens element on the optical axis, G45 is an air gap between the fourth lens element and the fifth lens element on the optical axis, and G56 is the air gap between the fifth lens element and the sixth lens element on the optical axis.

8. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through,
the third lens element has positive refracting power, and a periphery region of the object-side surface of the third lens element is concave,
a periphery region of the image-side surface of the fourth lens element is convex,
an optical axis region of the object-side surface of the fifth lens element is convex,
an optical axis region of the object-side surface of the sixth lens element is concave,
the seventh lens element has negative refracting power, and an optical axis region of the image-side surface of the seventh lens element is concave, and
the eighth lens element has negative refracting power,
wherein lens elements of the optical imaging lens are only the eight lens elements and satisfy a conditional expression as follows:
(V2+V3+V4+V6)/V7≤5.500, wherein V2 is an Abbe number of the second lens element, V3 is an Abbe number of the third lens element; V4 is an Abbe number of the fourth lens element, V6 is an Abbe number of the sixth lens element, and V7 is an Abbe number of the seventh lens element.

9. The optical imaging lens according to claim 8, wherein the optical imaging lens further satisfies a conditional expression as follows: EFL/(G23+G34+T4)≤6.500, wherein EFL is an effective focal length of the optical imaging lens, G23 is an air gap between the second lens element and the third lens element on the optical axis, G34 is an air gap between the third lens element and the fourth lens element on the optical axis, and T4 is a thickness of the fourth lens element on the optical axis.

10. The optical imaging lens according to claim 8, wherein the optical imaging lens further satisfies a conditional expression as follows: AAG/(T1+G45)≤2.500, wherein AAG is a sum of the seven air gaps of the first lens element to the eighth lens element on the optical axis, T1 is a thickness of the first lens element on the optical axis, and G45 is an air gap between the fourth lens element and the fifth lens element on the optical axis.

11. The optical imaging lens according to claim 8, wherein the optical imaging lens further satisfies a conditional expression as follows: V4+V5+V6≥90.000, wherein V5 is an Abbe number of the fifth lens element.

12. The optical imaging lens according to claim 8, wherein the optical imaging lens further satisfies a conditional expression as follows: ALT/(T2+T4+G45)≥4.600, wherein ALT is a sum of the thicknesses of the eight lens elements from the first lens element to the eighth lens element on the optical axis, T2 is a thickness of the second lens element on the optical axis, T4 is a thickness of the fourth lens element on the optical axis, and G45 is an air gap between the fourth lens element and the fifth lens element on the optical axis.

13. The optical imaging lens according to claim 8, wherein the optical imaging lens further satisfies a conditional expression as follows: $(T8+BFL)/G56 \geq 3.900$, wherein T8 is a thickness of the eighth lens element on the optical axis, BFL is a distance from the image-side surface of the eighth lens element to an image plane on the optical axis, and G56 is the air gap between the fifth lens element and the sixth lens element on the optical axis.

14. The optical imaging lens according to claim 8, wherein the optical imaging lens further satisfies a conditional expression as follows: $TL/(T7+BFL) \geq 4.900$, wherein TL is a distance from the object-side surface of the first lens element to the image-side surface of the eighth lens element on the optical axis, T7 is a thickness of the seventh lens element on the optical axis, and BFL is a distance from the image-side surface of the eighth lens element to an image plane on the optical axis.

15. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through, the third lens element has positive refracting power, and a periphery region of the object-side surface of the third lens element is concave,
an optical axis region of the image-side surface of the fourth lens element is concave,
an optical axis region of the image-side surface of the fifth lens element is concave,
an optical axis region of the object-side surface of the sixth lens element is concave,
the seventh lens element has negative refracting power, and an optical axis region of the image-side surface of the seventh lens element is concave, and
the second lens element has negative refracting power or the eighth lens element has negative refracting power,
wherein lens elements of the optical imaging lens are only the eight lens elements and satisfy a conditional expression as follows:
$(V2+V3+V4+V6)/V7 \leq 5.500$, wherein V2 is an Abbe number of the second lens element, V3 is an Abbe number of the third lens element; V4 is an Abbe number of the fourth lens element, V6 is an Abbe number of the sixth lens element, and V7 is an Abbe number of the seventh lens element.

16. The optical imaging lens according to claim 15, wherein the optical imaging lens further satisfies a conditional expression as follows: $T6/(G56+G67) \geq 1.900$, wherein T6 is a thickness of the sixth lens element on the optical axis, G56 is an air gap between the fifth lens element and the sixth lens element on the optical axis, and G67 is an air gap between the sixth lens element and the seventh lens element on the optical axis.

17. The optical imaging lens according to claim 15, wherein the optical imaging lens further satisfies a conditional expression as follows: $(T6+T8)/T2 \geq 3.900$, wherein T6 is a thickness of the sixth lens element on the optical axis, T8 is a thickness of the eighth lens element on the optical axis, and T2 is a thickness of the second lens element on the optical axis.

18. The optical imaging lens according to claim 15, wherein the optical imaging lens further satisfies a conditional expression as follows: $(T1+G12)/(T2+G23) \geq 1.100$, wherein T1 is a thickness of the first lens element on the optical axis, G12 is an air gap between the first lens element and the second lens element on the optical axis, T2 is a thickness of the second lens element on the optical axis, and G23 is an air gap between the second lens element and the third lens element on the optical axis.

19. The optical imaging lens according to claim 15, wherein the optical imaging lens further satisfies a conditional expression as follows: $ImgH/(T2+G23+T3) \geq 4.200$, wherein ImgH is an image height of the optical imaging lens, T2 is a thickness of the second lens element on the optical axis, G23 is an air gap between the second lens element and the third lens element on the optical axis, and T3 is a thickness of the third lens element on the optical axis.

20. The optical imaging lens according to claim 15, wherein the optical imaging lens further satisfies a conditional expression as follows: $(T3+G34+T4)/G23 \leq 3.500$, wherein T3 is a thickness of the third lens element on the optical axis, G34 is an air gap between the third lens element and the fourth lens element on the optical axis, T4 is a thickness of the fourth lens element on the optical axis, and G23 is an air gap between the second lens element and the third lens element on the optical axis.

* * * * *